US010452356B2

(12) United States Patent
Ichimiya et al.

(10) Patent No.: US 10,452,356 B2
(45) Date of Patent: Oct. 22, 2019

(54) ARITHMETIC PROCESSING APPARATUS AND CONTROL METHOD FOR ARITHMETIC PROCESSING APPARATUS

(71) Applicant: FUJITSU LIMITED, Kawasaki-shi, Kanagawa (JP)

(72) Inventors: Junji Ichimiya, Yokohama (JP); Masahiro Kuramoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 15/889,260

(22) Filed: Feb. 6, 2018

(65) Prior Publication Data

US 2018/0232207 A1 Aug. 16, 2018

(30) Foreign Application Priority Data

Feb. 14, 2017 (JP) ................................. 2017-025414

(51) Int. Cl.
*G06F 7/57* (2006.01)
*G06F 7/78* (2006.01)

(52) U.S. Cl.
CPC . *G06F 7/57* (2013.01); *G06F 7/78* (2013.01)

(58) Field of Classification Search
CPC ................................ G06F 7/78; G06F 12/0207
See application file for complete search history.

(56) References Cited

U.S. PATENT DOCUMENTS

| | | | | |
|---|---|---|---|---|
| 5,854,757 A | * | 12/1998 | Dierke | G06F 17/147 708/402 |
| 6,105,114 A | * | 8/2000 | Okuno | G06F 12/0207 711/155 |
| 6,353,633 B1 | * | 3/2002 | Her | G06T 3/4084 375/240.18 |
| 8,375,196 B2 | * | 2/2013 | Bjorklund | G06F 9/30032 712/4 |
| 2009/0031089 A1 | * | 1/2009 | Tuominen | G06F 7/785 711/149 |

FOREIGN PATENT DOCUMENTS

JP 11-053345 2/1999

OTHER PUBLICATIONS

C. Gu Building Embedded Systems, Programmable Hardware, Apress, 2016 (Year: 2016).*
C. Huang et al., A 249Mpixel/s HEVC Video-Decoder Chip for Quad Full HD Applications, 2013 IEEE International Solid-State Circuits Conference, p. 162-164 (Year: 2013).*

* cited by examiner

*Primary Examiner* — Andrew Caldwell
*Assistant Examiner* — Emily E Larocque
(74) *Attorney, Agent, or Firm* — Fujitsu Patent Center

(57) ABSTRACT

An arithmetic processing apparatus, includes: an arithmetic operation execution circuit configured to execute an arithmetic operation; a first register configured to store data to be used for an arithmetic operation by the arithmetic operation execution circuit; a first buffer configured to store data; a first controller configured to store, when an array of data is changed and the changed data is stored into the first register as the data to be used for the arithmetic operation, a plurality of data groups, which are successively received, into the first buffer; and a second controller configured to successively output, every time each of the plurality of data groups is stored into the first buffer, data included in the data groups stored in the first buffer to the first register.

16 Claims, 29 Drawing Sheets

FIG. 29

ARITHMETIC PROCESSING APPARATUS AND CONTROL METHOD FOR ARITHMETIC PROCESSING APPARATUS

CROSS-REFERENCE TO RELATED APPLICATION

This application is based upon and claims the benefit of priority of the prior Japanese Patent Application No. 2017-025414, filed on Feb. 14, 2017, the entire contents of which are incorporated herein by reference.

FIELD

The embodiments discussed herein are related to an arithmetic processing apparatus and a control method for an arithmetic processing apparatus.

BACKGROUND

In data processing such as image processing, transposition data are used in which rows and columns are replaced in an array of data.

A related art is disclosed in Japanese Laid-open Patent Publication No. 11-53345.

SUMMARY

According to an aspect of the embodiments, an arithmetic processing apparatus, includes: an arithmetic operation execution circuit configured to execute an arithmetic operation; a first register configured to store data to be used for an arithmetic operation by the arithmetic operation execution circuit; a first buffer configured to store data; a first controller configured to store, when an array of data is changed and the changed data is stored into the first register as the data to be used for the arithmetic operation, a plurality of data groups, which are successively received, into the first buffer; and a second controller configured to successively output, every time each of the plurality of data groups is stored into the first buffer, data included in the data groups stored in the first buffer to the first register.

The object and advantages of the invention will be realized and attained by mean of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 depicts an example of operation of the register output selector unit depicted in FIG. 8;

FIG. 17 depicts an example of operation of the register input selector unit depicted in FIG. 9;

FIG. 18 depicts an example of operation of the memory output selector unit depicted in FIG. 11;

FIG. 27 depicts an example of operation of the register output selector unit depicted in FIG. 22;

FIG. 28 depicts an example of operation of the register input selector unit depicted in FIG. 22; and FIG. 29 depicts an example of operation of the memory output selector unit depicted in FIG. 22.

DESCRIPTION OF EMBODIMENTS

Data are transposed, for example, by writing data into memory cells arranged in the row direction of a memory cell array and reading out data from memory cells arranged in the column direction. Here, if a memory cell array including multiport memory cells having a first port and a second port is used, data may be converted into transposition data without a break. In this case, in each of a given number of cycles, after data are read out, writing of data is executed for memory cells arranged in the row direction of the memory cell array using the first port. In each of the next given number of cycles, after the reading out of data from the memory cells arranged in the column direction of the memory cell array is performed using the second port, writing of data is executed.

For example, where transposition data are generated utilizing a memory cell array including multiport memory cells, a control circuit for a row decoder, a column decoder and so forth may be complicated in comparison with a control circuit that controls a memory cell array including single-port memory cells. For example, the area of a multiport memory cell is greater than the area of a single-port memory cell. Therefore, in a memory cell array of the multiport configuration, although transposition data are generated without a break, the configuration may be complicated and complicated control may be performed.

For example, data arrayed in rows and columns are retained in a buffer unit including a plurality of flip-flop circuits, and transposition data are generated by changing the order of data to be read out from the buffer unit and the order of data written in the buffer unit. However, where transposition data are generated without a break, since two buffer units for alternately retaining data are used, the circuit scale of the circuitry may increase.

For example, the circuit scale of a buffer unit that generates transposition data without a break may be reduced.

Figure 1:
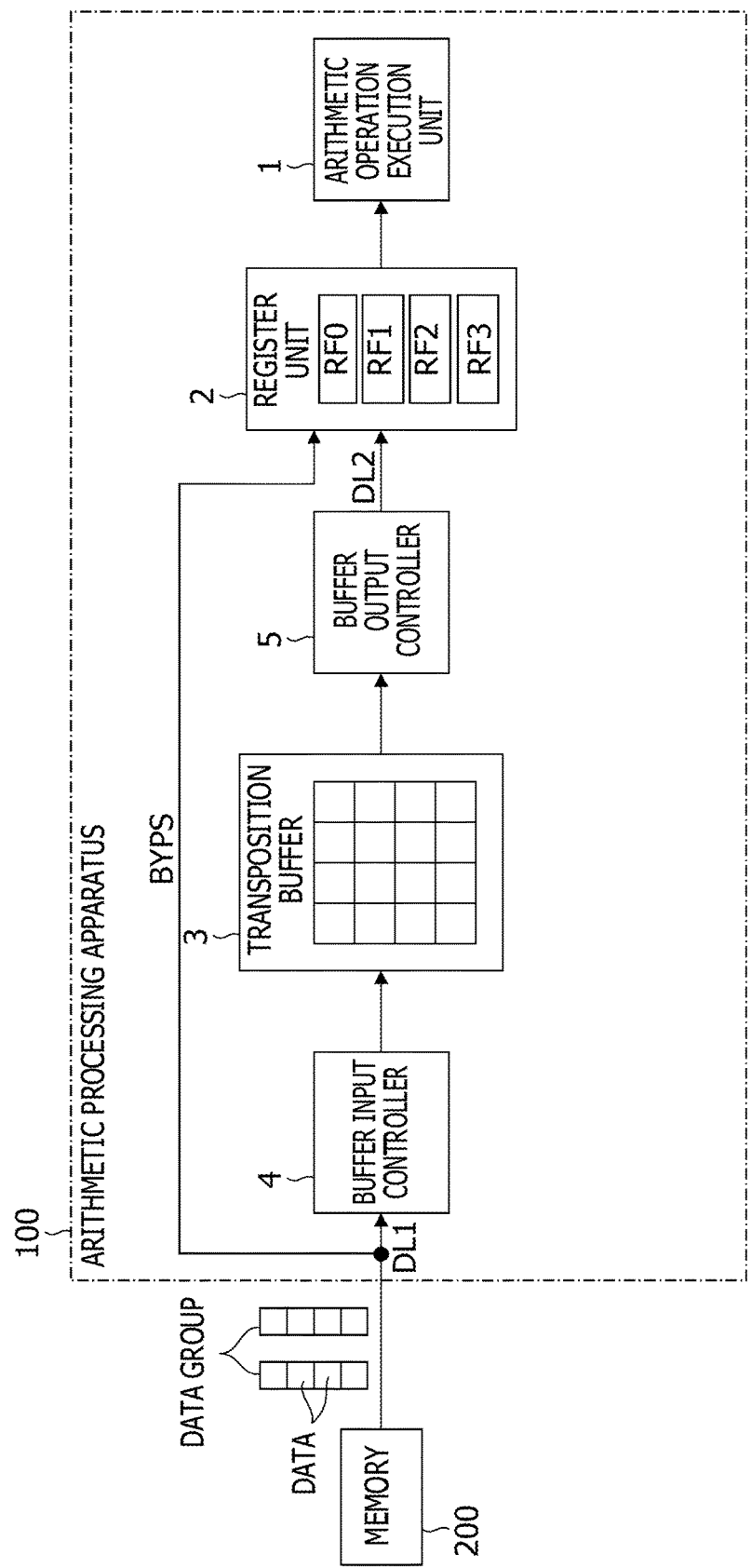
FIG. 1 depicts an example of an arithmetic processing apparatus.

FIG. 1 depicts an example of an arithmetic processing apparatus. The arithmetic processing apparatus 100 depicted in FIG. 1 includes an arithmetic operation execution unit 1 that executes an arithmetic operation, a register unit 2, a transposition buffer 3, a buffer input controller 4 and a buffer output controller 5. The register unit 2 is an example of a first register unit, and the transposition buffer 3 may be an example of a first buffer unit; the buffer input controller 4 may be an example of a first controller; and the buffer output controller 5 may be an example of a second controller.

The register unit 2 includes a plurality of register files RF (RF0, RF1, RF2 and RF3) into which data used for an arithmetic operation of the arithmetic operation execution unit 1 are stored. The transposition buffer 3 retains data to be stored into the register unit 2 before the data are stored into the register unit 2. In FIG. 1, the transposition buffer 3 includes a retention region for retaining 16 data each indicated by a rectangle.

The buffer input controller 4 stores a plurality of data groups successively received from a memory 200 by the arithmetic processing apparatus 100 through a data line DL1 in the received order into the transposition buffer 3. Every time each of the plurality of data groups is stored into the transposition buffer 3, the buffer output controller 5 successively outputs data included in the data group stored in the transposition buffer 3 to the register unit 2 through a data line DL2. The arithmetic processing apparatus 100 includes a bypass route BYPS for transferring data on the data line DL1 directly to the register unit 2 without the intervention of the transposition buffer 3. The bypass route BYPS is used when data read out from the memory 200 are stored into the register unit 2 without transposing the array of the data as described with reference to FIGS. 2 and 4.

Though not specifically restricted, the plurality of data groups received from the memory 200 are, for example, image data. The arithmetic operation execution unit 1 executes, for example, a program to execute discrete cosine transform (DCT) transform for image data retained in the register unit 2 or to execute various filtering processes for image data retained in the register unit 2. For example, the arithmetic processing apparatus 100 is an artificial intelligence (AI) processor for deep learning. Alternatively, the arithmetic processing apparatus 100 is a processor such as a central processing unit (CPU), a digital signal processor (DSP), a graphics processing unit (GPU) or a general purpose computing on GPU (GPGPU). It is to be noted that the arithmetic processing apparatus 100 may be an accelerator that executes image processing or the like in place of a processor.

Figure 2:
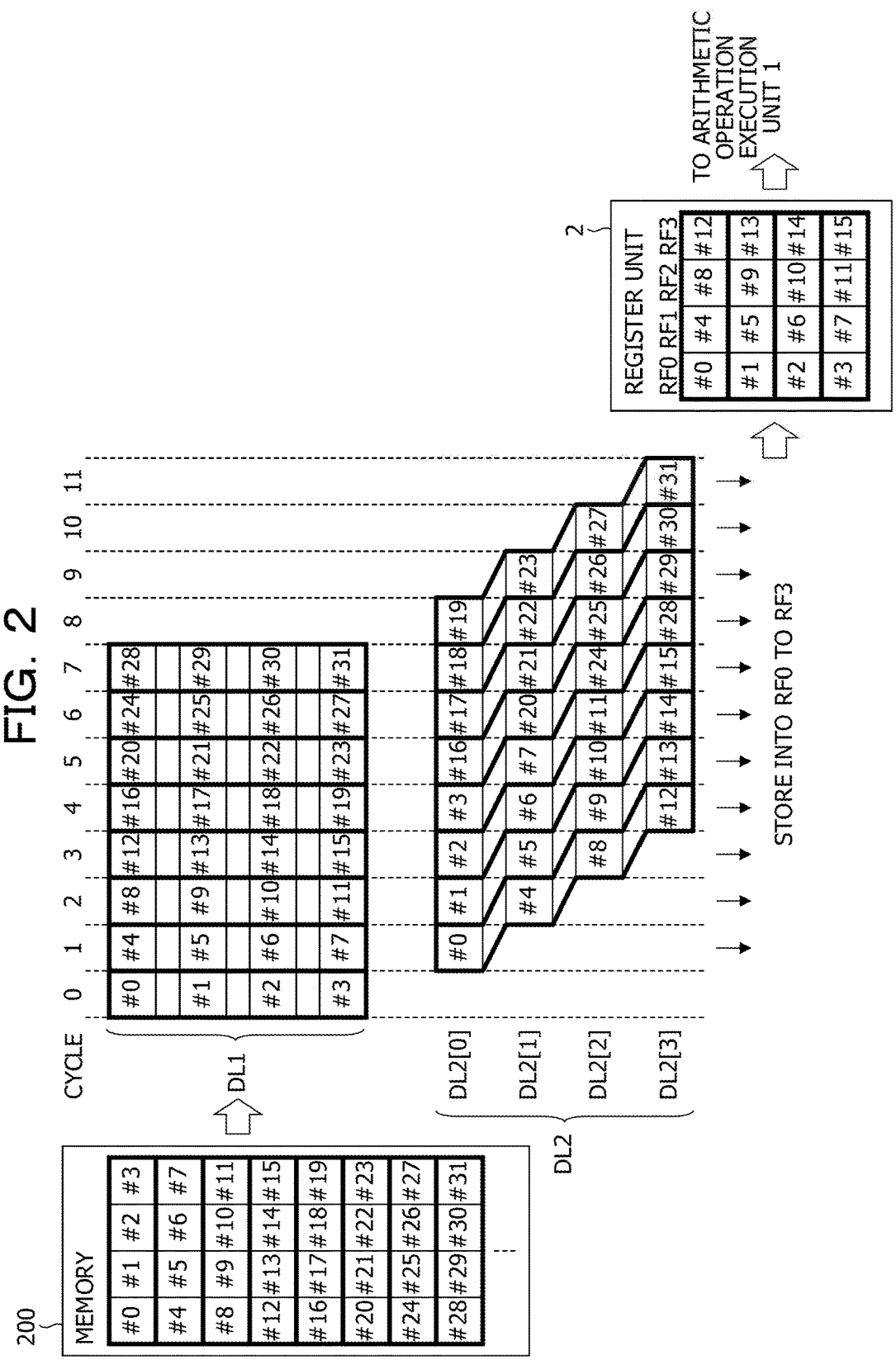
FIG. 2 depicts an example of operation of the arithmetic processing apparatus depicted in FIG. 1.

FIG. 2 depicts an example of operation of the arithmetic processing apparatus 100 depicted in FIG. 1. For example, FIG. 2 depicts an example of a control method of the arithmetic processing apparatus 100. In FIG. 2, a cycle indicates, for example, a clock cycle. In FIG. 2, the memory 200 retains a plurality of data (#0 to #31). The data are read out from the memory 200 for each data group including four data (for example, #0, #1, #2 and #3).

The buffer input controller 4 stores each data group read out from the memory 200 into the transposition buffer 3 through the data line DL1. In FIG. 2, four data surrounded by a thick frame from among the data retained in the memory 200 and four data surrounded by a thick frame from among data transmitted to the data line DL1 indicate data groups.

The buffer output controller 5 successively stores, for each data group, four data included in the data group stored in the transposition buffer 3 to one of the register files RF0 to RF3 over four cycles from a cycle next to the cycle in which the data group is stored into the transposition buffer 3. For example, every time each of the data groups is stored into the transposition buffer 3, the buffer output controller 5 successively outputs the data included in the data group stored in the transposition buffer 3 to the register unit 2 through the data line DL2. The arithmetic operation execution unit 1 executes arithmetic operation using four data stored dispersedly in the register files RF0 to RF3.

For example, the data line DL2 includes data lines DL2 [0], DL2[1], DL2[2] and DL2[3] corresponding to the register files RF0 to RF3, respectively. In FIG. 2, four data surrounded by a thick frame from among data transmitted to the data line DL2 and four data surrounded by a thick frame from among data retained in the register unit 2 indicate a unit of data used for each arithmetic operation by the arithmetic operation execution unit 1. For example, the arithmetic operation execution unit 1 executes arithmetic operation using the data #0, #4, #8 and #12 and executes arithmetic operation using the data #1, #5, #9 and #13. Further, the arithmetic operation execution unit 1 executes arithmetic operation using the data #2, #6, #10 and #14, and executes arithmetic operation using the data #3, #7, #11 and #15.

The array of four data used for each arithmetic operation by the arithmetic operation execution unit 1 is different from the array of four data read out at once from the memory 200. For example, the buffer input controller 4 and the buffer output controller 5 transpose the data read out from the memory 200 and retained in the transposition buffer 3 and store the transposed data into the register unit 2.

The buffer input controller 4 stores the data #0 to #15 successively into the transposition buffer 3 using the cycle 0 to the cycle 3 and then successively stores the data #16 to #31 into the transposition buffer 3 using the cycle 4 to the cycle 7. For example, the data group #16 to #19 is stored into a retention region of the transposition buffer 3 in which the data group #0 to #3 is stored, and the data group #20 to #23 is stored into a retention region of the transposition buffer 3 in which the data group #4 to #7 is stored. The data group #24 to #27 is stored into a retention region of the transposition buffer 3 in which the data group #8 to #11 is stored, and the data group #28 to #31 is stored into a retention region of the transposition buffer 3 in which the data group #12 to #15 is stored.

The data #3 is read out from the transposition buffer 3 in the cycle 4, and the data #16 is stored into the transposition buffer 3 in the cycle 4. Therefore, when the data group #16 to #19 is stored into the transposition buffer 3 in the cycle 4, the data group #0 to #3 has been read out from the transposition buffer 3 into the data line DL2[0]. Accordingly, also when the data groups #16 to #31 are to be transferred without a break after the data groups #0 to #15, the data group #0 to #3 is stored into the register files RF0 to RF3 without being lost.

Also in the cycle 5 to the cycle 7, similarly as in the cycle 4, before a new data group is stored into the transposition buffer 3, a data group already retained in the transposition buffer 3 is read out from the transposition buffer 3. Accordingly, by successively storing, every time a data group is retained into the transposition buffer 3, a plurality of data included in a data group into the register unit 2, data to be transposed may be successively stored into the transposition buffer 3 without overwriting data retained in the transposition buffer 3. As a result, it is possible to transpose a plurality of data and successively store the transposed data into the register unit 2 utilizing the single transposition buffer 3, and the arithmetic operation execution unit 1 may successively execute a plurality of arithmetic operations using data read out from the memory 200 and transposed.

In contrast, if data is transposed by transferring, after the 16 data #0 to #15 are stored into the transposition buffer 3 utilizing the cycle 0 to the cycle 3, the data from the transposition buffer 3 to the register unit 2 using the cycle 4 to the cycle 7, the following failure may occur. For example, in the cycle 4 in which the data #16 to #19 are stored into the transposition buffer 3, the data #0, #4, #8 and #12 are transferred from the transposition buffer 3 to the register unit 2. In this case, the data #1, #2 and #3 retained into the transposition buffer 3 in the cycle 0 may be overwritten with the data #17, #18 and #19 and may be lost before they are transferred to the register unit 2. In order to suppress such loss of data, for example, two transposition buffers 3 are provided such that 16 data are alternately stored into the two transposition buffers 3. During a cycle in which data are stored into one of the transposition buffers 3, data are transferred from the other transposition buffer 3 to the register unit 2.

For example, when an arithmetic operation is executed without transposing data, data read out from the memory 200 depicted in FIG. 1 are stored into the register unit 2 through the bypass route BYPS. In this case, for example, the data #0, #1, #2 and #3 are stored into the register files RF0 to RF3, respectively. For example, the data #0, #4, #8 and #12 are stored into the register file RF0; the data #1, #5, #9 and #13 are stored into the register file RF1; the data #2, #6, #10 and #14 are stored into the register file RF2; and the data #3, #7, #11 and #15 are stored into the register file RF3.

Figure 3:
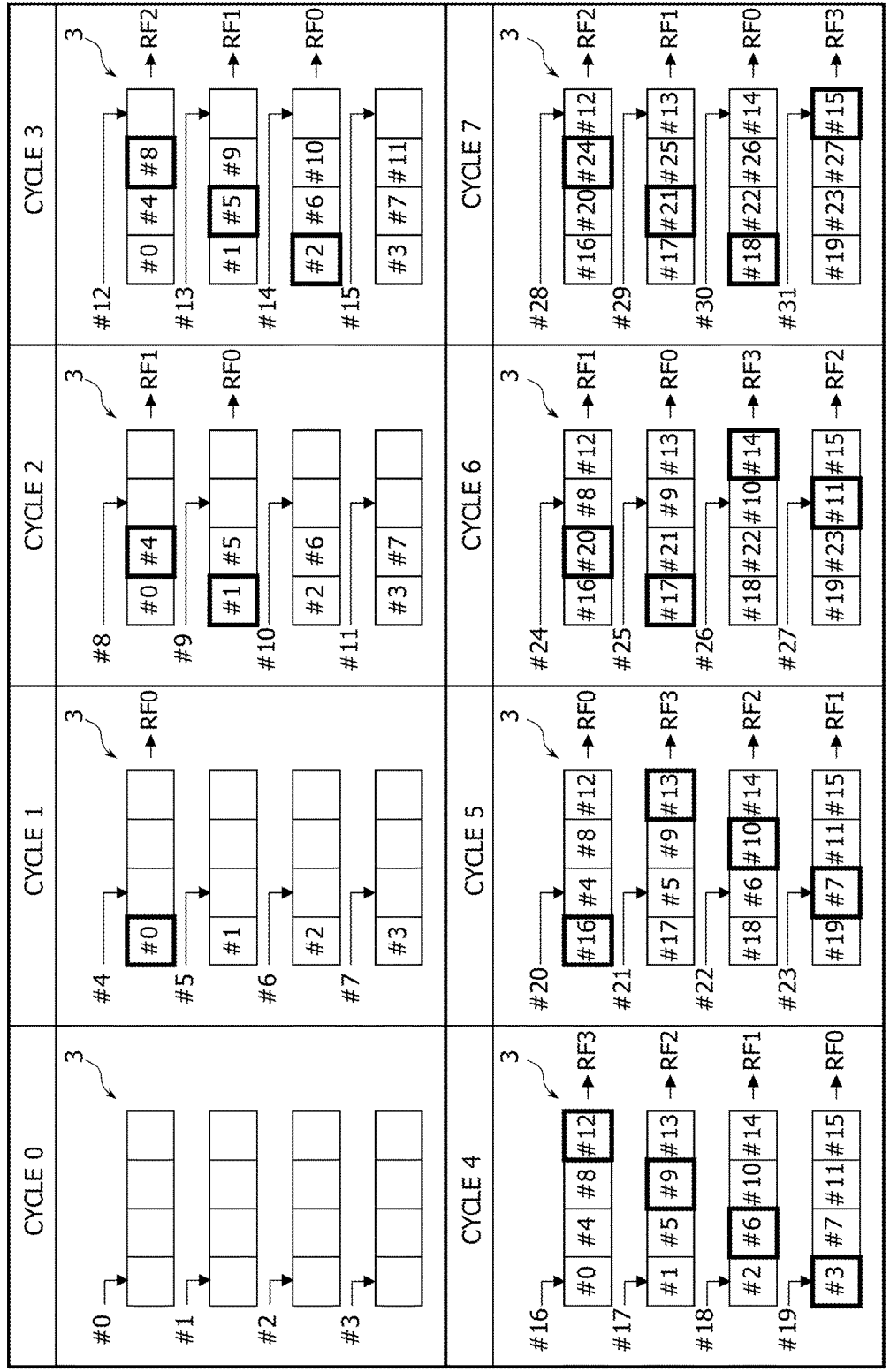
FIG. 3 depicts an example of operation of a transposition buffer in a cycle 0 to a cycle 7 depicted in FIG. 2.

FIG. 3 depicts an example of operation of the transposition buffer 3 in the cycle 0 to the cycle 7 depicted in FIG. 2. For example, FIG. 3 depicts an example of a control method of the arithmetic processing apparatus 100. Referring to FIG. 3, a bent arrow mark indicates that data is written into a retention region of the transposition buffer 3. A retention region indicated by a thick frame indicates a retention region from which data is read out, and reference symbols RF0 to RF3 each applied to the head of a rightwardly directed arrow mark represent the register files RF0 to RF3 into which data read out from retention regions are stored.

For example, in the cycle 4, after the data #12, #9, #6 and #3 are read out from the transposition buffer 3, the data #16, #17, #18 and #19 are written into the transposition buffer 3. The data #0, #1, #2 and #3 retained in the transposition buffer 3 disappear by the writing of the data #16, #17, #18 and #19. However, since transfer of the data #0, #1, #2 and #3 to the register files RF0 to RF3 over the cycle 1 to the cycle 4 is completed already, a trouble does not occur.

Similarly, in the cycle 5, after the data #16, #13, #10 and #7 are read out from the transposition buffer 3, the data #20, #21, #22 and #23 are written into the transposition buffer 3. The data #4, #5, #6 and #7 retained in the transposition buffer 3 disappear by the writing of the data #20, #21, #22 and #23. However, since transfer of the data #4, #5, #6 and #7 to the register files RF0 to RF3 over the cycle 2 to the cycle 5 is completed already, a trouble does not occur.

Figure 4:
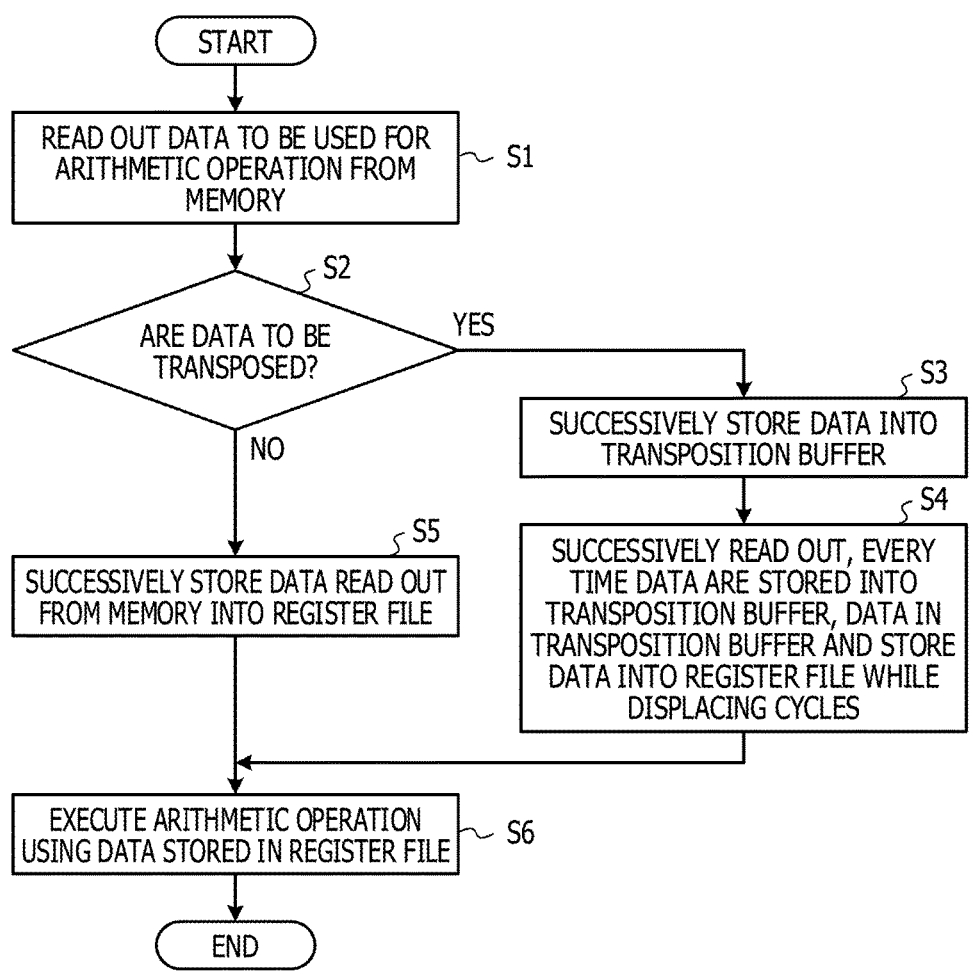
FIG. 4 depicts an example of operation of the arithmetic processing apparatus depicted in FIG. 1.

FIG. 4 depicts an example of operation of the arithmetic processing apparatus 100 depicted in FIG. 1. For example, FIG. 4 depicts an example of a control method of the arithmetic processing apparatus 100. In operation S1, the arithmetic processing apparatus 100 reads out data to be used for an arithmetic operation from the memory 200. Reading out of data from the memory 200 is executed, for example, based on a load instruction from the arithmetic processing apparatus 100. In operation S2, the arithmetic processing apparatus 100 decides whether or not data are to be transposed. Whether or not data are to be transposed is decided, for example, based on a value of a transposition flag included in the operand of the load instruction. When data are to be transposed, the operation is advanced to operation S3, but when data are not to be transposed, the operation is advanced to operation S5.

In operation S3, the arithmetic processing apparatus 100 successively stores data read out from the memory 200 into the transposition buffer 3. Further, in operation S4, the arithmetic processing apparatus 100 successively reads out, every time data are stored into the transposition buffer 3, the data stored in the transposition buffer 3 and stores the data into the register files RF0 to RF3 while the cycle is successively displaced. The data are transposed in the process by which the data are stored into the register unit 2 through the transposition buffer 3. As depicted in FIGS. 2 and 3, the operations in operations S3 and S4 may be executed in parallel. After operations S3 and S4, the operation is advanced to operation S6.

When the data are not to be transposed, in operation S5, the arithmetic processing apparatus 100 stores the data read out from the memory 200 so as to be used for an arithmetic operation into the register files RF0 to RF3 through the bypass route BYPS, and the operation is advanced to operation S6. In operation S6, the arithmetic processing apparatus 100 executes an arithmetic operation using the data stored in the register files RF0 to RF3 in accordance with an arithmetic operation instruction and ends the operation. A result of the arithmetic operation is stored into a region, for example, in the register files RF0 to RF3, into which data may be written without any trouble such as a region in which data from the memory 200 are not stored. The result of the arithmetic operation is transferred from the register unit 2 to the memory 200, for example, in response to execution of a store instruction from the arithmetic processing apparatus 100.

In the foregoing description given with reference to FIGS. 1 to 4, every time a data group is retained into the transposition buffer 3, the arithmetic processing apparatus 100 successively stores a plurality of data included in the data group into the register unit 2. Consequently, also when data to be transposed are successively supplied to the transposition buffer 3, the data are transposed without being lost, and the transposed data are stored into the register unit 2. Accordingly, the arithmetic operation execution unit 1 successively executes a plurality of arithmetic operations using the data read from the memory 200 and transposed. Since transposition data are generated without a break using the single transposition buffer 3, increase of the circuit scale of the transposition buffer 3 may be suppressed. By transferring data read out from the memory 200 to the register unit 2 through the bypass route BYPS, the data are stored into the register files RF0 to RF3 without being transposed.

Figure 5:
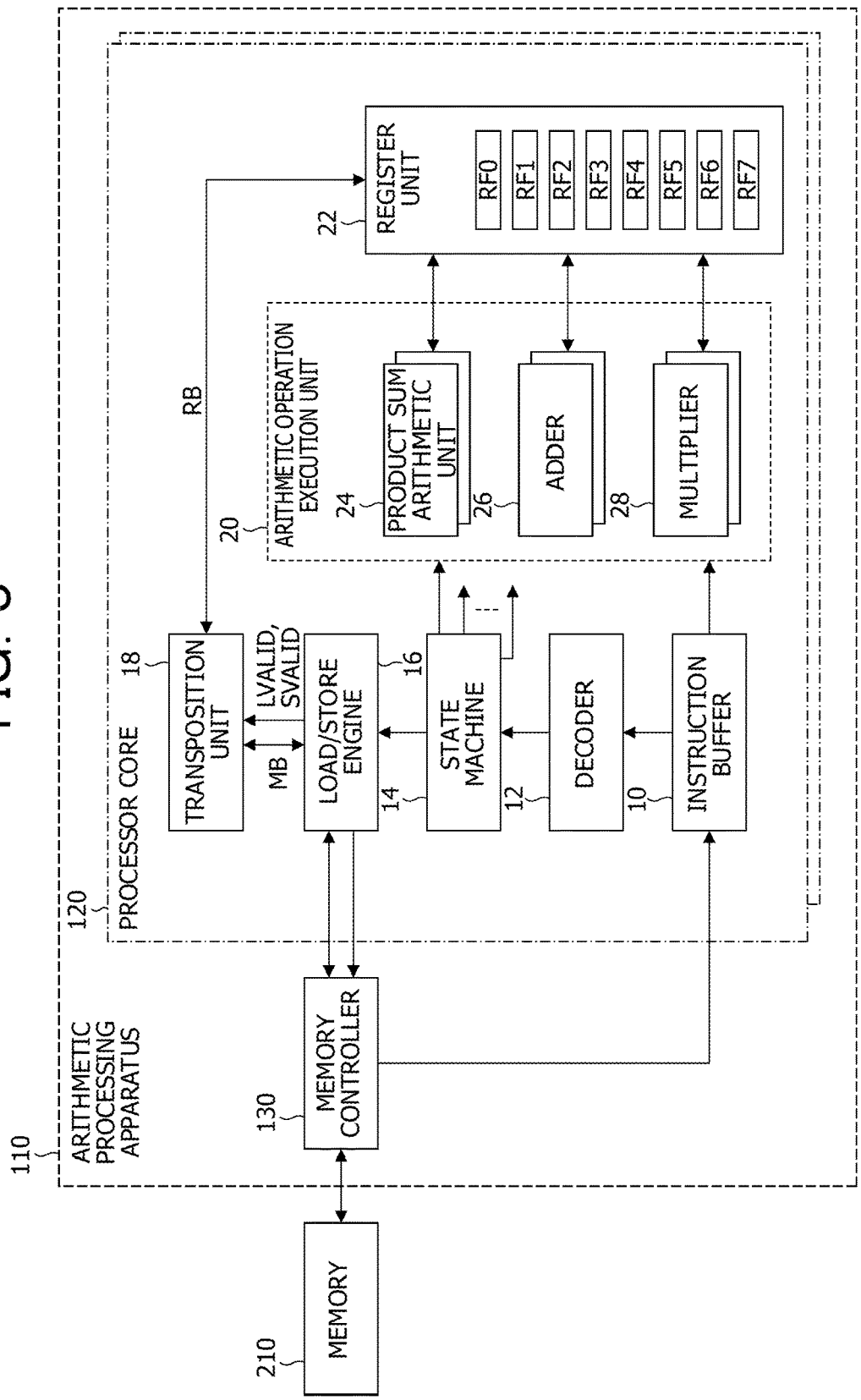
FIG. 5 depicts another example of an arithmetic processing apparatus.

FIG. 5 depicts another example of an arithmetic processing apparatus. The arithmetic processing apparatus 110 depicted in FIG. 5 is an AI processor for deep learning or a processor such as a CPU, a DSP, a GPU or a GPGPU. It is to be noted that the arithmetic processing apparatus 110 may otherwise be an accelerator.

The arithmetic processing apparatus 110 includes a plurality of processor cores 120 and a memory controller 130. The arithmetic processing apparatus 110 may otherwise include a single processor core 120. Each processor core 120 includes an instruction buffer 10, a decoder 12, a state machine 14, a load/store engine 16, a transposition unit 18, an arithmetic operation execution unit 20 and a register unit 22.

The instruction buffer 10 successively retains instructions read out from a memory 210 through the memory controller 130 and successively outputs the retained instructions to the decoder 12. The decoder 12 decodes an instruction transferred thereto from the instruction buffer 10 and outputs an instruction code, a register address and so forth included in the decoded instruction to the state machine 14.

The state machine 14 includes a plurality of entries for retaining instructions. The state machine 14 decides a dependency of the instructions retained in the entries and selects an executable instruction from among the instructions retained in the entries based on the decided dependency. If the selected instruction is an arithmetic operation instruction, the state machine 14 outputs the selected arithmetic operation instruction to the arithmetic operation execution unit 20. If the selected instruction is a memory access instruction (load instruction or store instruction), the state machine 14 outputs the selected memory access instruction to the load/store engine 16.

The load/store engine 16 outputs an instruction to read out data from the memory 210 to the memory controller 130 based on reception of a load instruction. The load/store engine 16 receives data read out from the memory 210 through the memory controller 130 and outputs the received data to the transposition unit 18 through a memory bus MB together with a valid signal LVALID.

The load/store engine 16 outputs a valid signal SVALID to the transposition unit 18 in response to reception of a store instruction and receives data outputted from the register unit 22 through the transposition unit 18 through the memory bus MB. The load/store engine 16 outputs an instruction to write the data received from the transposition unit 18 through the memory bus MB into the memory 210 to the memory controller 130 together with the data.

The memory controller 130 reads out an instruction from the memory 210 based on an address generated by a program counter provided in the processor core 120 and outputs the read out instruction to the instruction buffer 10. The memory controller 130 reads out data from the memory 210 in accordance with a readout instruction from the load/store engine 16 and writes the data into the memory 210 in accordance with a write instruction from the load/store engine 16.

The transposition unit 18 receives data (load data) outputted from the load/store engine 16 in accordance with a load instruction through the memory bus MB and outputs the received data to the register unit 22 through a register bus RB. The transposition unit 18 receives the data (store data) outputted from the register unit 22 in accordance with a store instruction through the register bus RB and outputs the received data to the load/store engine 16 through the memory bus MB. Examples of the transposition unit 18 are depicted in FIGS. 6 to 11.

The arithmetic operation execution unit 20 includes a plurality of product sum arithmetic units 24, a plurality of adders 26 and a plurality of multipliers 28. Each of the product sum arithmetic units 24 includes a multiplier and an adder and adds a result of multiplication by the multiplier using the adder. Each of the adders 26 executes addition. Each of the multipliers 28 executes multiplication or division. The numbers of product sum arithmetic units 24, adders 26 and multipliers 28 are not restricted to those of the example depicted in FIG. 5 and also the type of the arithmetic operation is not restricted. The product sum arithmetic units 24, adders 26 and multipliers 28 each may be of the fixed point type or of the floating point type. The arithmetic operation execution unit 20 may include the product sum arithmetic units 24, adders 26 and multipliers 28 of both the fixed point type and the floating point type.

Figure 12:
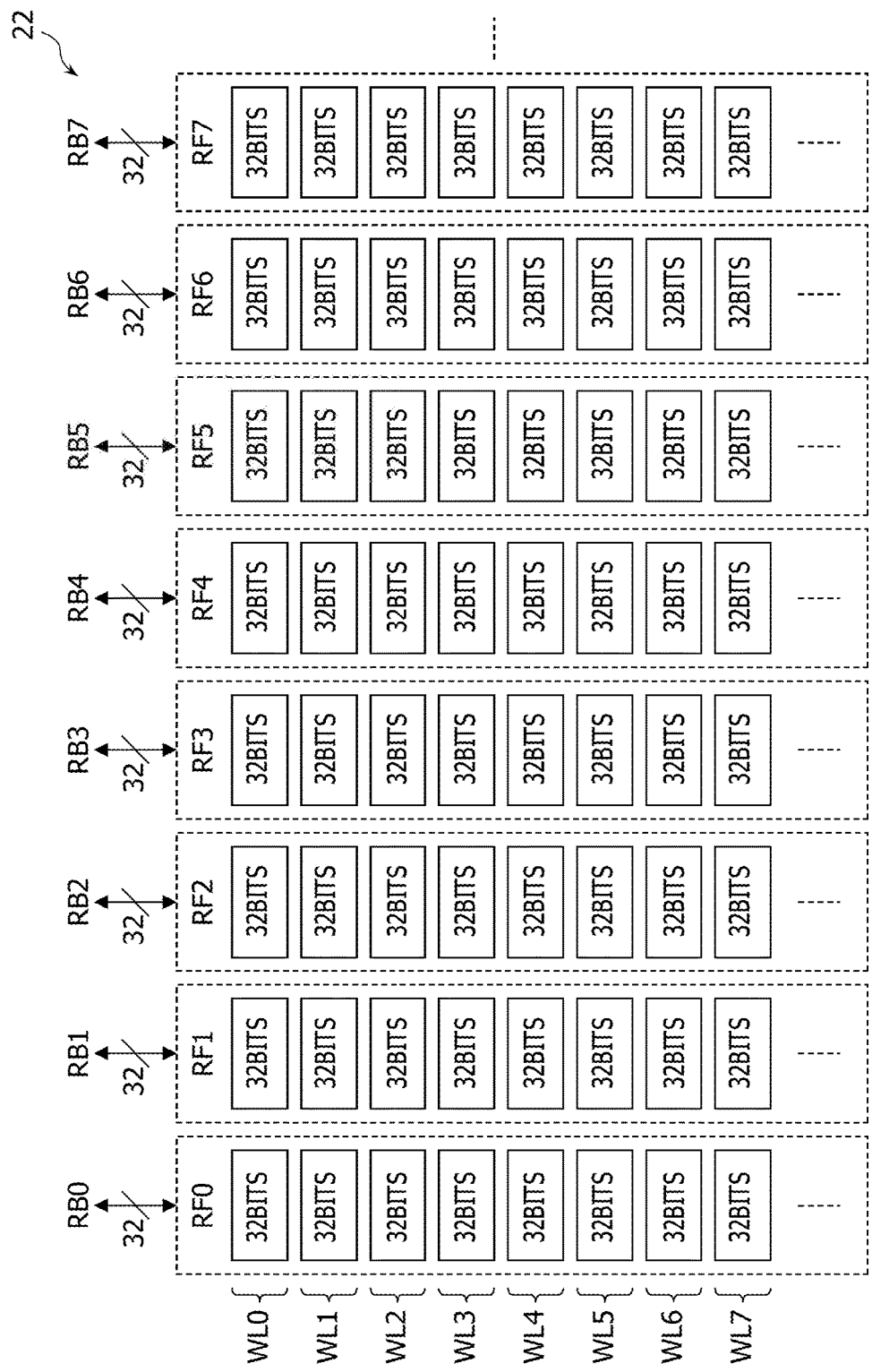
FIG. 12 depicts an example of a register unit depicted in FIG. 5.
Figure 13:
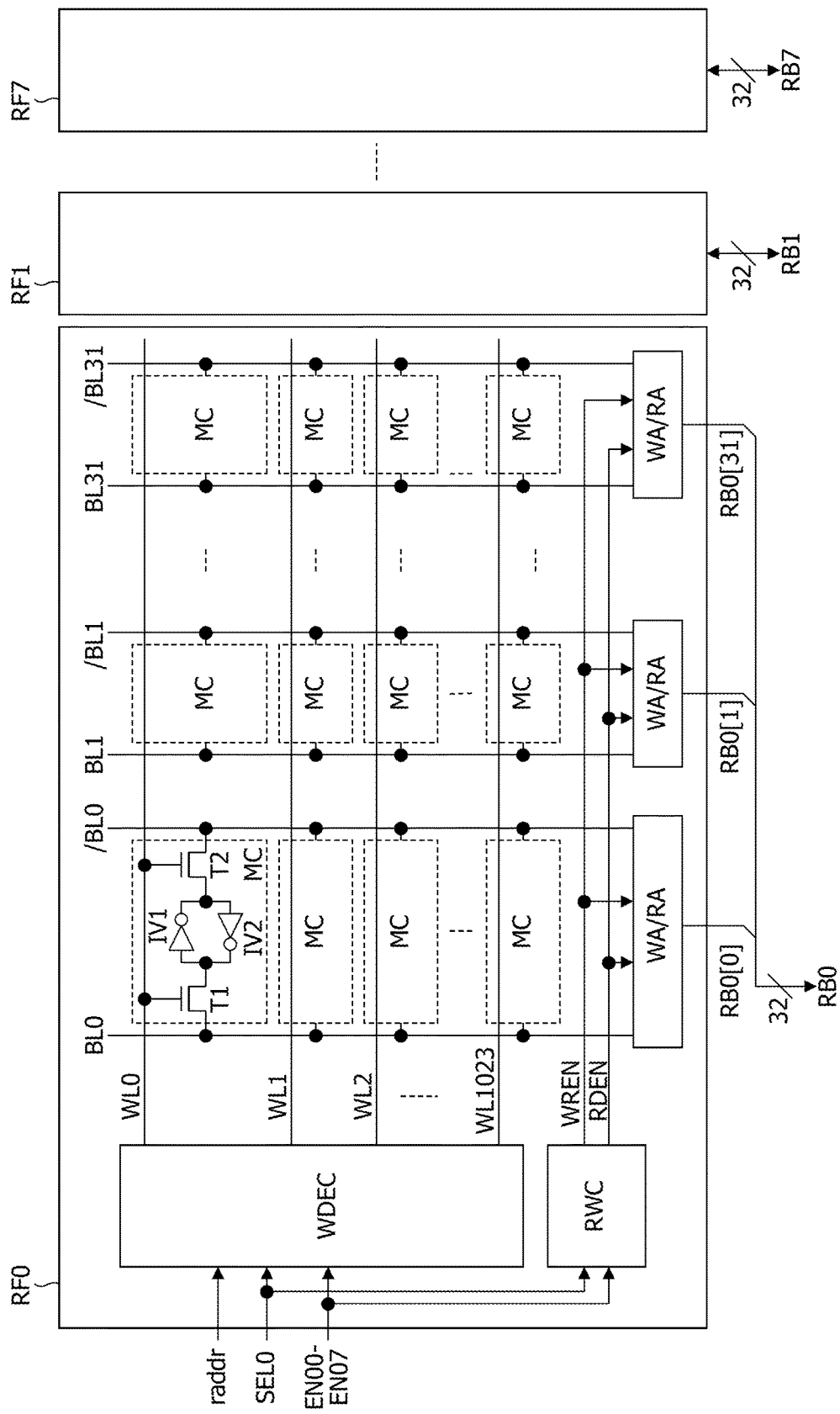
FIG. 13 depicts an example of a register file depicted in FIG. 12.

The register unit 22 includes a plurality of register files RF (RF0 to RF7) for retaining data transferred thereto through the register bus RB and data indicative of a result of an arithmetic operation by the arithmetic operation execution unit 20. An example of the register files RF0 to RF7 is depicted in FIGS. 12 and 13.

Figure 6:
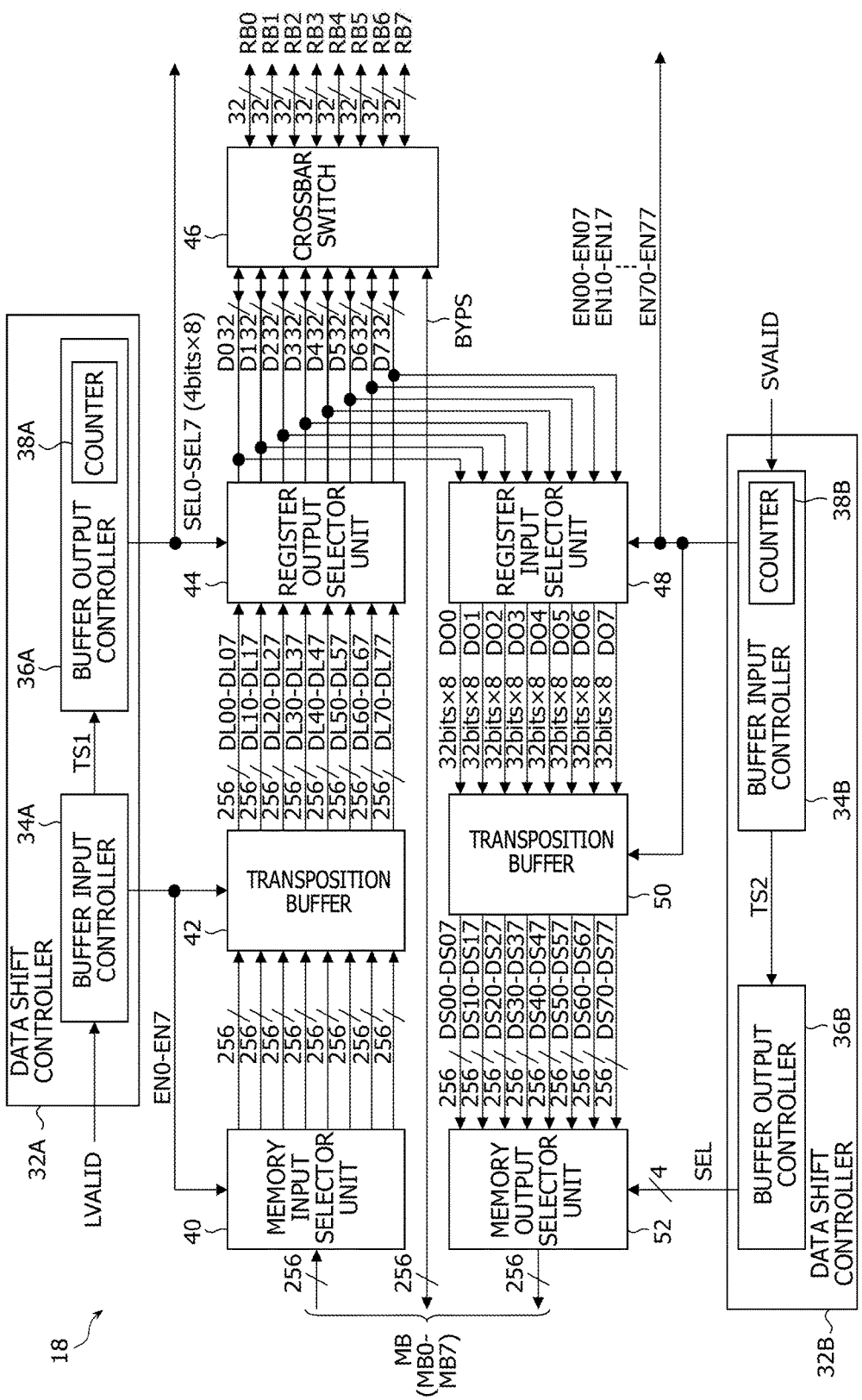
FIG. 6 depicts an example of a transposition unit depicted in FIG. 5.

FIG. 6 depicts an example of the transposition unit depicted in FIG. 5. The transposition unit 18 includes data shift controllers 32A and 32B, a memory input selector unit 40, a transposition buffer 42, a register output selector unit 44, a crossbar switch 46, a register input selector unit 48, a transposition buffer 50 and a memory output selector unit 52. The data shift controller 32A includes a buffer input controller 34A and a buffer output controller 36A that includes a plurality of counters 38A. The data shift controller 32B includes a buffer input controller 34B including a plurality of counters 38B, and a buffer output controller 36B.

The memory input selector unit 40 may be an example of a first selector unit, and the memory output selector unit 52 may be an example of a fourth selector unit. The buffer input controller 34A and the memory input selector unit 40 may be an example of a first controller, and the buffer output controller 36A and the register output selector unit 44 may be an example of a second controller. The buffer input controller 34B and the register input selector unit 48 may be an example of a third controller, and the buffer output controller 36B and the memory output selector unit 52 may be an example of a fourth controller. The transposition buffer 42 may be an example of a first buffer unit, and the transposition buffer 50 may be an example of a second buffer unit.

The buffer input controller 34A outputs one of enable signals EN (EN0 to EN7) in synchronism with a valid signal LVALID outputted from the load/store engine 16 depicted in FIG. 5. Every time an enable signal EN is outputted, the buffer input controller 34A outputs a transfer start signal TS1 to the buffer output controller 36A. The load/store engine 16 outputs a valid signal LVALID every time it outputs a data group including a plurality of data to the transposition unit 18.

Figure 14:
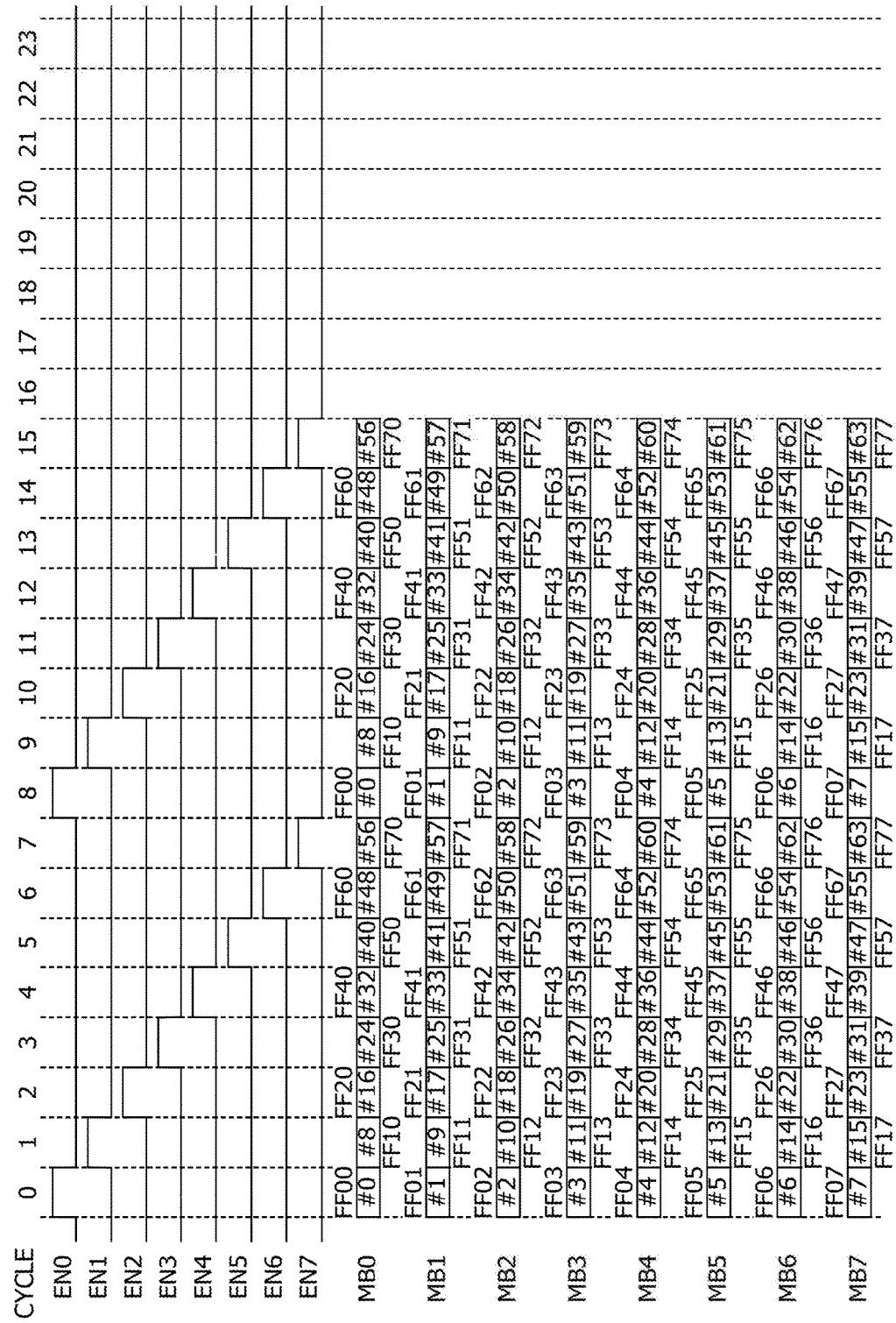
FIG. 14 depicts an example of operation of the memory input selector unit depicted in FIG. 7.

The buffer input controller 34A sequentially outputs enable signals EN0 to EN7 in synchronism with a plurality of valid signals LVALID received in accordance with a load instruction. Although the following describes an example in which eight data groups are supplied to the transposition unit 18 in accordance with one load instruction in order to facilitate the description, the number of data groups to be supplied to the transposition unit 18 may be any one of "1" to "8" corresponding to one load instruction. For example, each data group has 256 bits. An example of the enable signals EN0 to EN7 generated by the buffer input controller 34A is depicted in FIG. 14.

An expression (1) indicates an example of a load instruction Id. The load instruction Id includes, in the operand, a memory address maddr, a register address raddr, a transfer length length and a transposition flag trans. The memory address maddr indicates the top address of the memory 210 from which data is read out, and the register address raddr indicates the top address of a register file RF into which data is written. The transfer length length indicates the number of data transferred (byte number or word number). The transposition flag trans is set to "1" when data read out from the memory 210 are to be transposed and written into the register unit 22, but is set to "0" when data read out from the memory 210 are to be written into the register unit 22 without being transposed. In the following, in order to facilitate understandings of the description, it is assumed that the register address raddr indicates to which position of each of the register files RF0 to RF7 depicted in FIG. 12 data is to be written in the form of a number, and the transfer length length is 256 bytes.

$$\text{Id maddr raddr length trans} \qquad (1)$$

The buffer output controller 36A receives a transfer start signal TS1 from the buffer input controller 34A, renders the counter 38A operative and outputs selection signals SEL0 to SEL7 in accordance with a counter value counted by the counter 38A. The selection signals SEL0 to SEL7 may be an example of a first selection signal, and the buffer output controller 36A may be an example of a first signal generator that successively generates selection signals SEL0 to SEL7.

Figure 15:
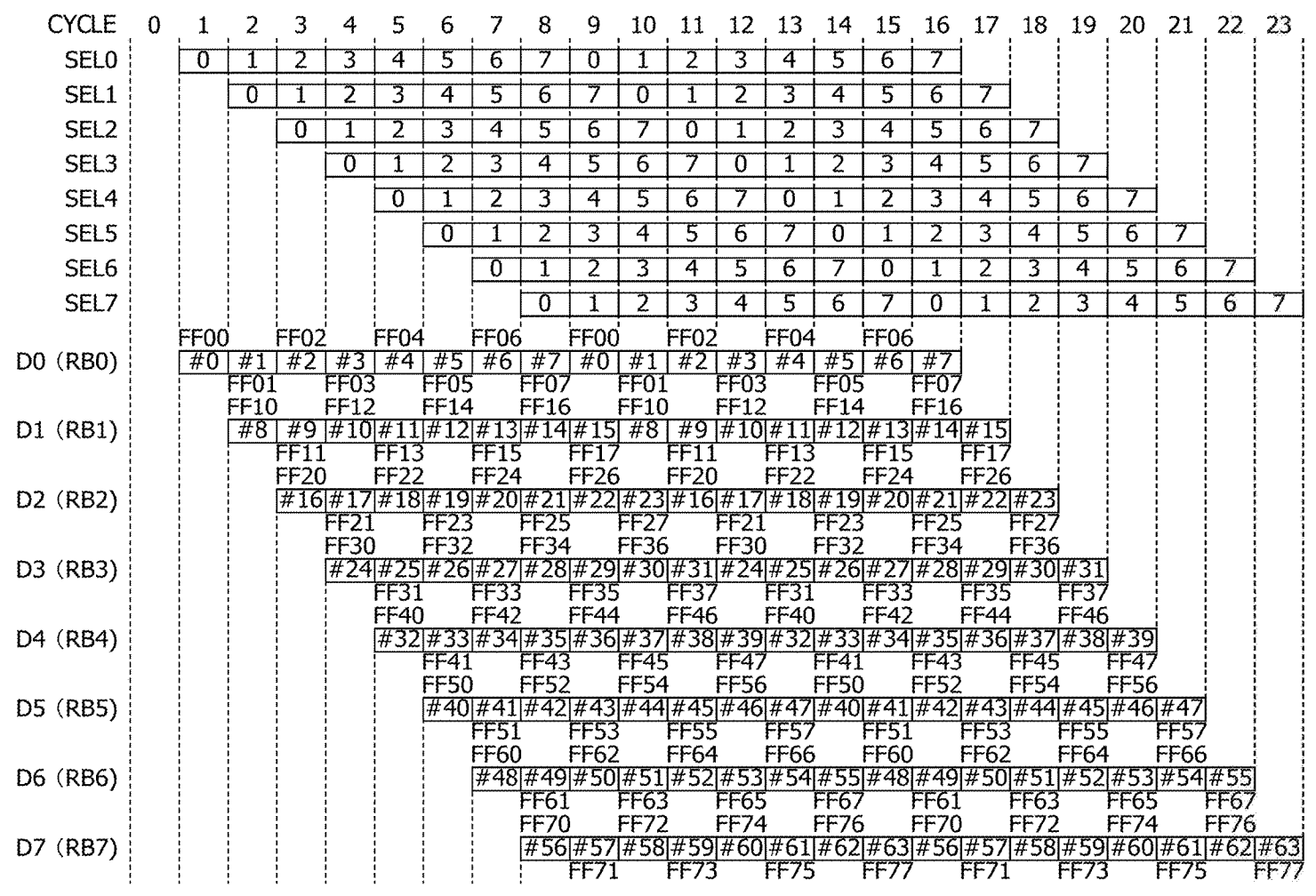

For example, the buffer output controller 36A includes a counter 38A for controlling data lines D0 to D7. The counter 38A starts counting if it receives a transfer start signal TS1, and generates each of the selection signals SEL0 to SEL7. An example of the selection signals SEL0 to SEL7 generated by the counter 38A of the buffer output controller 36A is depicted in FIG. 15. The selection signals SEL0 to SEL7 are supplied also to the register unit 22 depicted in FIG. 5 and are used for control to store data into the register files RF0 to RF7.

Figure 7:
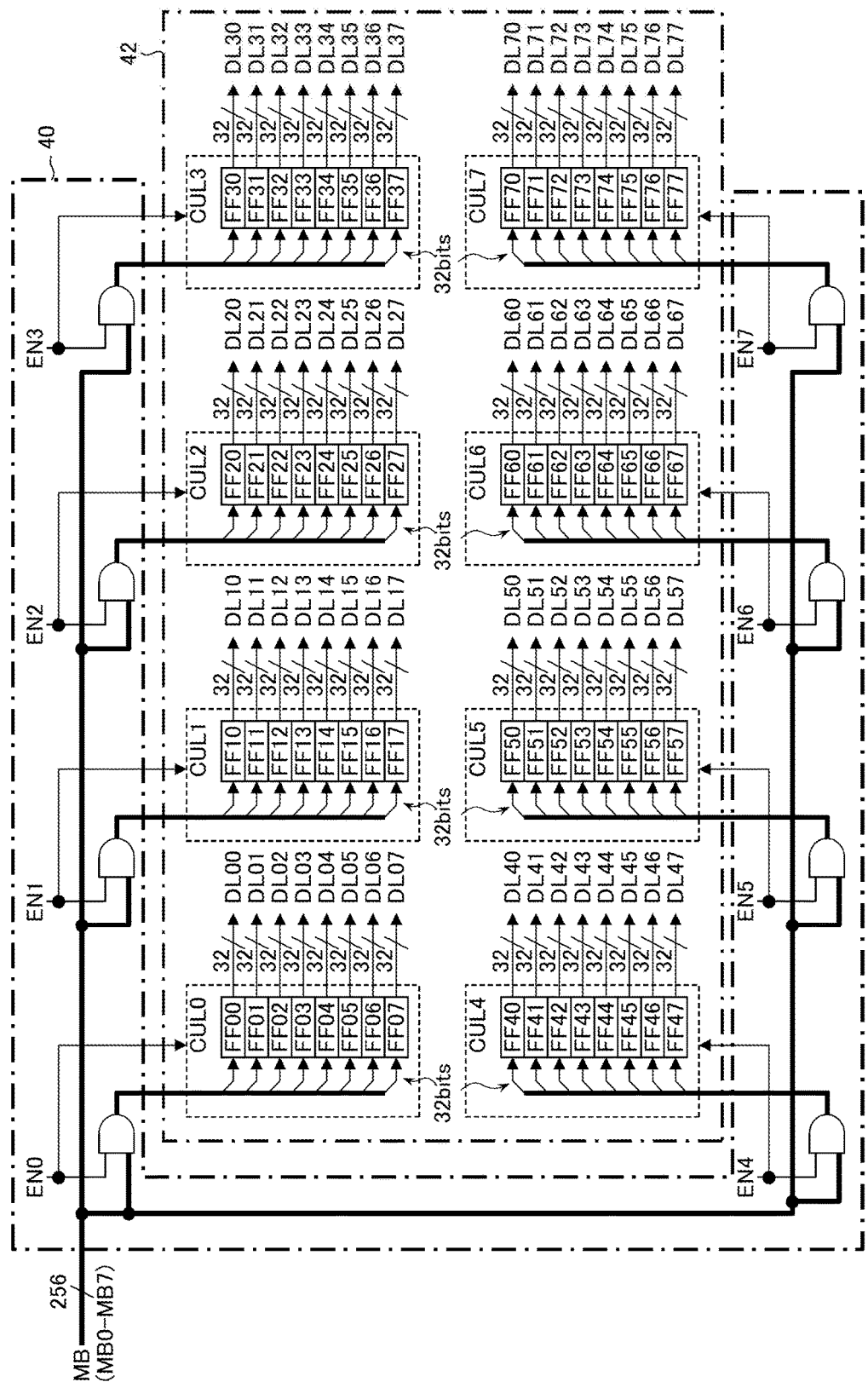
FIG. 7 depicts an example of a memory input selector unit and a transposition buffer depicted in FIG. 6.

The memory input selector unit 40 outputs data of 256 bits received through the memory bus MB to one of eight data lines (256 bits) in response to the enable signals EN0 to EN7. The memory bus MB includes eight memory buses MB0 to MB7, and each of the memory buses MB0 to MB7 is a 32-bit bus. Data outputted to one of the eight data lines from the memory input selector unit 40 is supplied to the transposition buffer 42. An example of the memory input selector unit 40 is depicted in FIG. 7, and an example of operation of the memory input selector unit 40 is depicted in FIG. 14.

The transposition buffer 42 retains data of 2048 bits received through the memory input selector unit 40 in accordance with a load instruction Id and outputs the retained data 256 bits by 256 bits to the data lines DL (DL0 to DL7). An example of the transposition buffer 42 is depicted in FIG. 7. The data line DL0 indicates data lines DL0° to DL07; the data line DL1 indicates data lines DL10 to DL17; the data line DL2 indicates data lines DL20 to DL27; and the data line DL3 indicates data lines DL30 to DL37. The data line DL4 indicates data lines DL40 to DL47; the data line DL5 indicates data lines DL50 to DL57; the data line DL6 indicates data lines DL60 to DL67; and the data line DL7 indicates data lines DL70 to DL77. Each of the data lines DL00 to DL77 is a 32-bit line.

Figure 8:
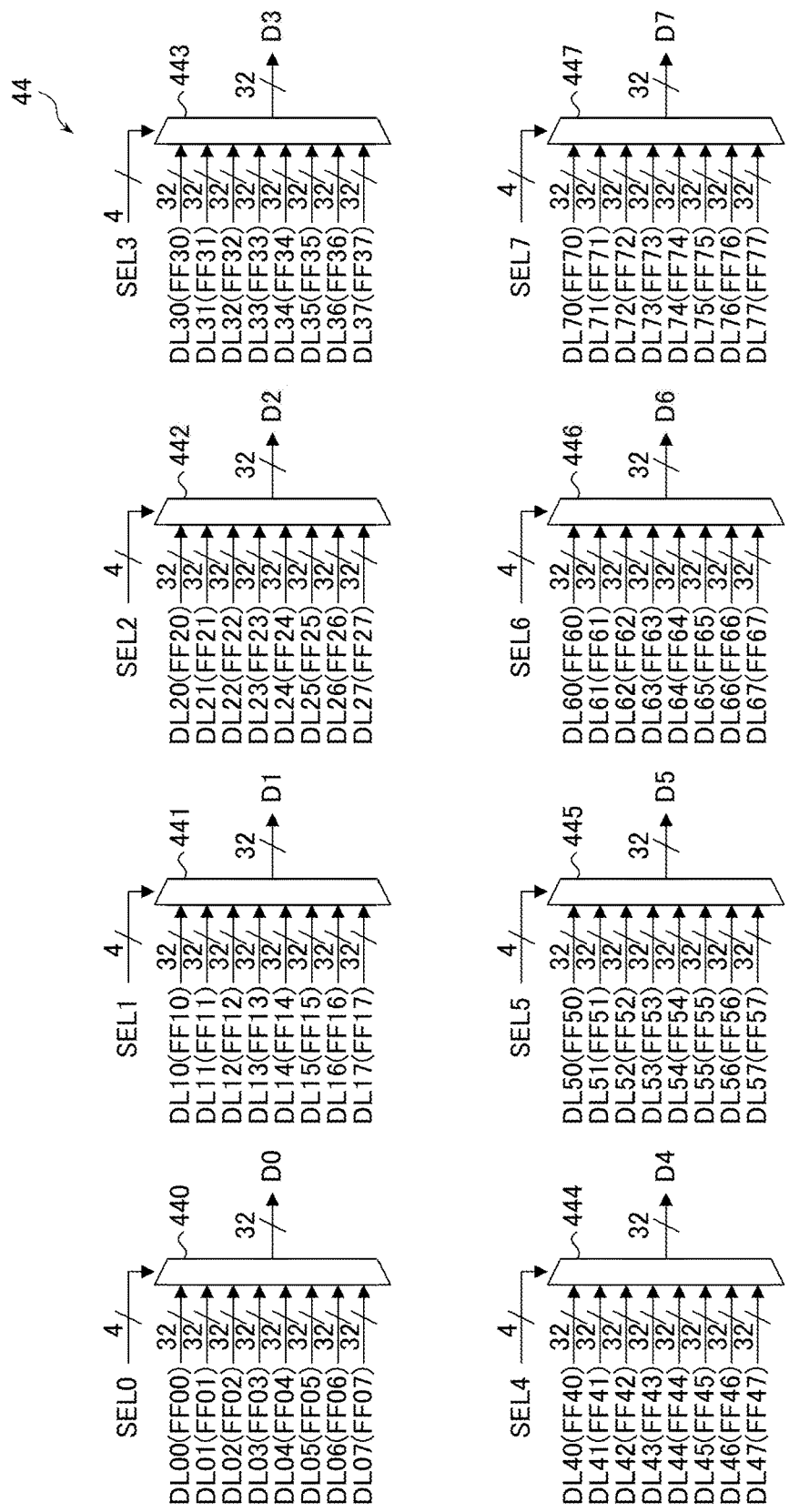
FIG. 8 depicts an example of a register output selector unit depicted in FIG. 6.

The register output selector unit 44 selects data of 2048 bits received through the data lines DL0 to DL7 32 bits by 32 bits in response to the selection signals SEL0 to SEL7 and outputs the selected data to one of the data lines D (D0 to D7) of 32 bits. The selection signals SEL0 to SEL7 are used for selection of the data lines DL0 to DL7, respectively. For example, each of the selection signals SEL0 to SEL7 is a 4-bit signal. If the most significant one bit is valid, one of the data lines DL0° to DL77 is selected in accordance with the logic of the lower 3 bits. For example, in response to the value ("0" to "7") of the selection signal SEL0, one of the data lines DL0° to DL07 is selected, and in response to the value ("0" to "7") of the selection signal SEL1, one of the data lines DL10 to DL17 is selected. An example of the register output selector unit 44 is depicted in FIG. 8, and an example of operation of the register output selector unit 44 is depicted in FIG. 15.

The crossbar switch 46 couples each of the data lines D (D0 to D7) to one of the register buses RB (RB0 to RB7) or couples the bypass route BYPS to the register bus RB. The crossbar switch 46 may be an example of a switching unit that couples a register bus RB (for example, a register file RF) to an output of the register output selector unit 44, an input of the register input selector unit 48 or the bypass route BYPS. It is to be noted that, in the following description, in order to facilitate understandings of the description, it is assumed that the crossbar switch 46 couples the data lines D0 to D7 to the register buses RB0 to RB7, respectively, and does not change the coupling. For example, each data line D is coupled to a register bus RB having the same number at the end.

The register output selector unit 44 and the register input selector unit 48 are coupled to the crossbar switch 46 using ones of the data lines D0 to D7 which are different from each other. In this case, the crossbar switch 46 couples one of the data lines D0 to D7 coupled to the register output selector unit 44 to one of the register buses RB0 to RB7 in accordance with a load instruction Id. The crossbar switch 46 couples one of the register buses RB0 to RB7 to one of the data lines D0 to D7 coupled to the register input selector unit 48 in accordance with a store instruction st.

The bypass route BYPS is used to store data read out from the memory 210 in accordance with the load instruction Id into the register unit 22 without being transposed similarly as in FIG. 1. The bypass route BYPS is used to store data indicative of a result of an arithmetic operation or the like retained in the register unit 22 into the memory 210 without being transposed in accordance with the store instruction st. By using the bypass route BYPS, data read out from the memory 210 may be stored into the register unit 22 without being transposed, and data read out from the register unit 22 may be stored into the memory 210 without being transposed.

If the buffer input controller 34B receives a valid signal SVALID outputted from the load/store engine 16 depicted in FIG. 5, it renders the counter 38B operative and outputs enable signals EN00 to EN77 according to a counter value counted by the counter 38B. The enable signals EN00 to EN77 may be an example of a second selection signal, and the buffer input controller 34B may be an example of a second signal generator that generates the enable signals EN00 to EN77.

Figure 17:
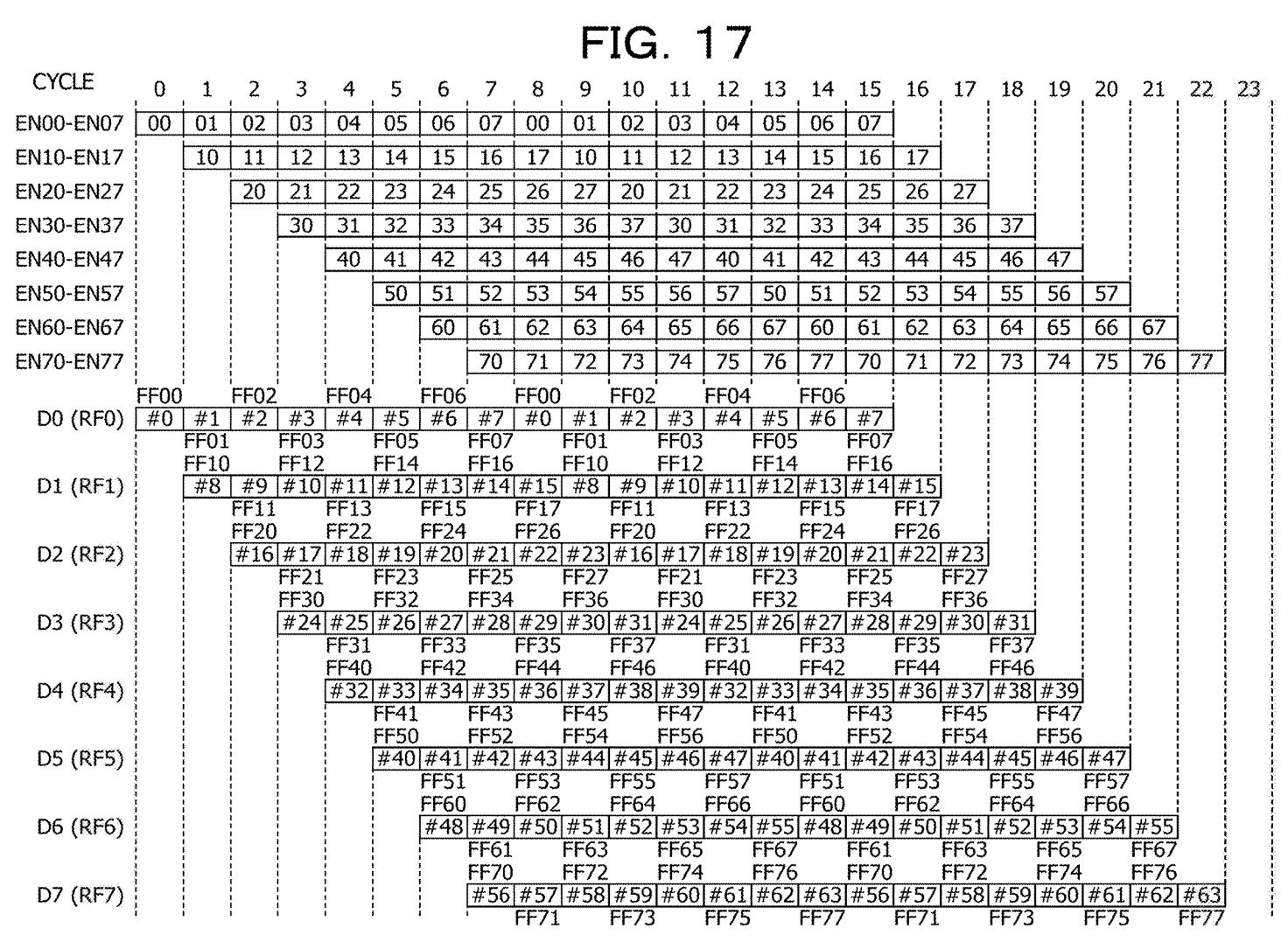

For example, the buffer input controller 34B includes a counter 38B corresponding to the data lines D0 to D7. The counter 38B starts counting for timings at which data are outputted from each of the register files RF0 to RF7 to the data line D and generates enable signals EN00 to EN77 under the control of the buffer input controller 34B. An example of the enable signals EN00 to EN77 generated by the counter 38B of the buffer input controller 34B is depicted in FIG. 17. It is to be noted that the enable signals EN00 to EN77 are supplied also to the register unit 22 depicted in FIG. 5 and are used for control to read out data from the register files RF0 to RF7.

When the load/store engine 16 depicted in FIG. 5 executes a store instruction, it outputs a valid signal SVALID in accordance with a readout cycle of data from the register files RF0 to RF7. The buffer input controller 34B outputs a transfer start signal TS2 to the buffer output controller 36B in response to that a first data group is prepared in the transposition buffer 50. In the following, in order to facilitate the description, an example in which the transposition buffer 50 retains eight data groups in accordance with one store instruction is described. However, the number of data groups retained by the transposition buffer 50 in accordance with one store instruction may be any of "1" to "8."

An expression (2) depicts an example of the store instruction st. The store instruction st includes, in the operand, a register address raddr, a memory address maddr, a transfer length length and a transposition flag trans. The register address raddr indicates the top address of a register file RF from which data is read out, and the memory address maddr indicates the top address of the memory 210 into which data is written. The transfer length length indicates the number of data transferred (byte number or word number). The transposition flag trans is set to "1" when data read out from the register unit 22 is to be transposed and written into the memory 210, but is set to "0" when data read out from the register unit 22 is to be written into the memory 210 without being transposed. In the following, in order to facilitate understandings of the description, it is assumed that the register address raddr indicates a number indicative of a position of each of the register files RF0 to RF7 depicted in FIG. 12 into which data is to be stored, and the transfer length length has 256 bytes similarly to the load instruction ld.

$$\text{st raddr maddr length trans} \quad (2)$$

Figure 18:
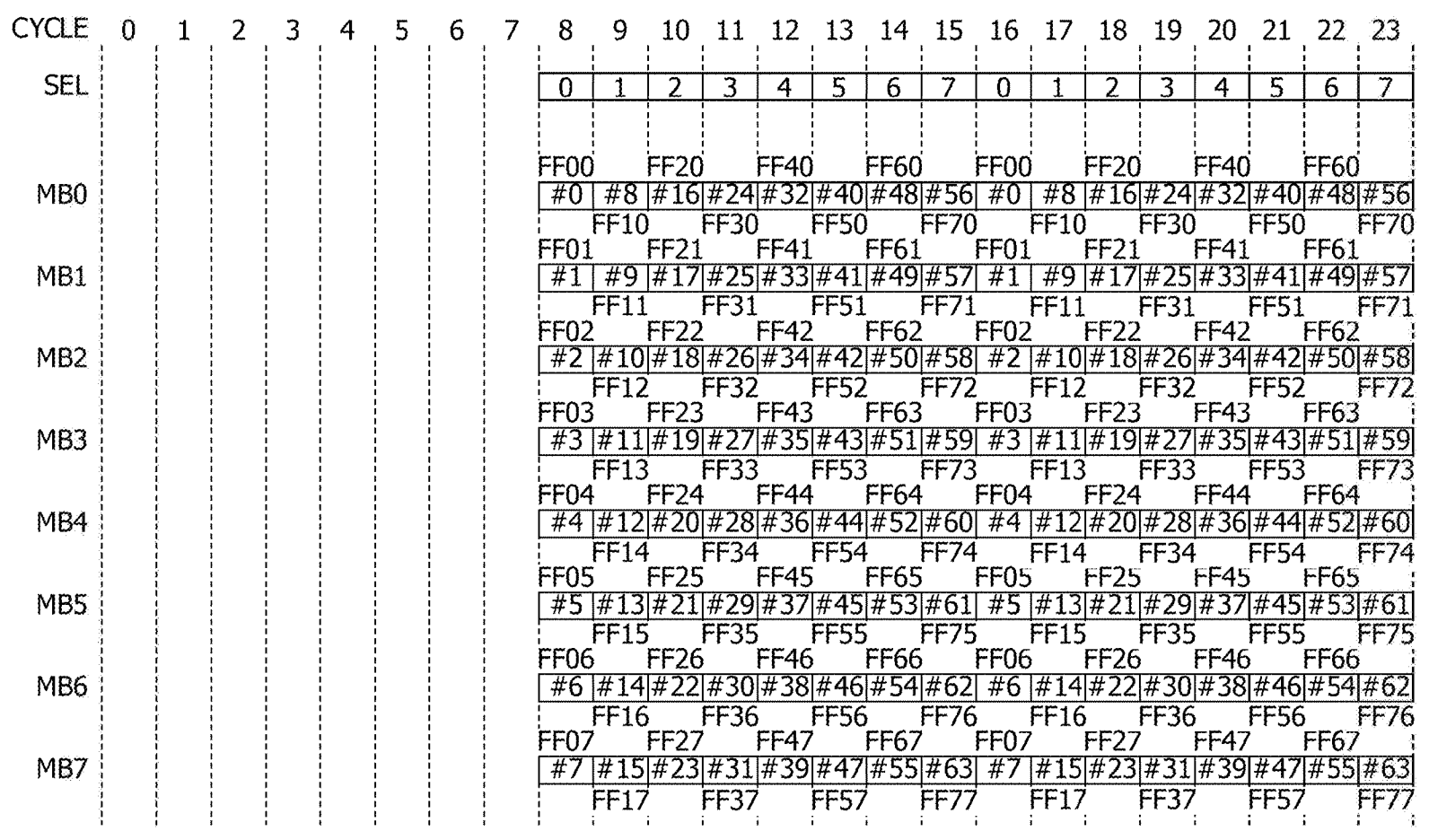

If the buffer output controller 36B receives a transfer start signal TS2 from the buffer input controller 34B, it successively outputs a selection signal SEL. For example, the selection signal SEL varies from "0" to "7" for each cycle. It is to be noted that the buffer output controller 36B may generate a selection signal SEL using a counter. The selection signal SEL may be an example of a third selection signal, and the buffer output controller 36B may be an example of a third signal generator that generates a selection signal SEL. An example of the selection signal SEL generated by the buffer output controller 36B is depicted in FIG. 18.

Figure 9:
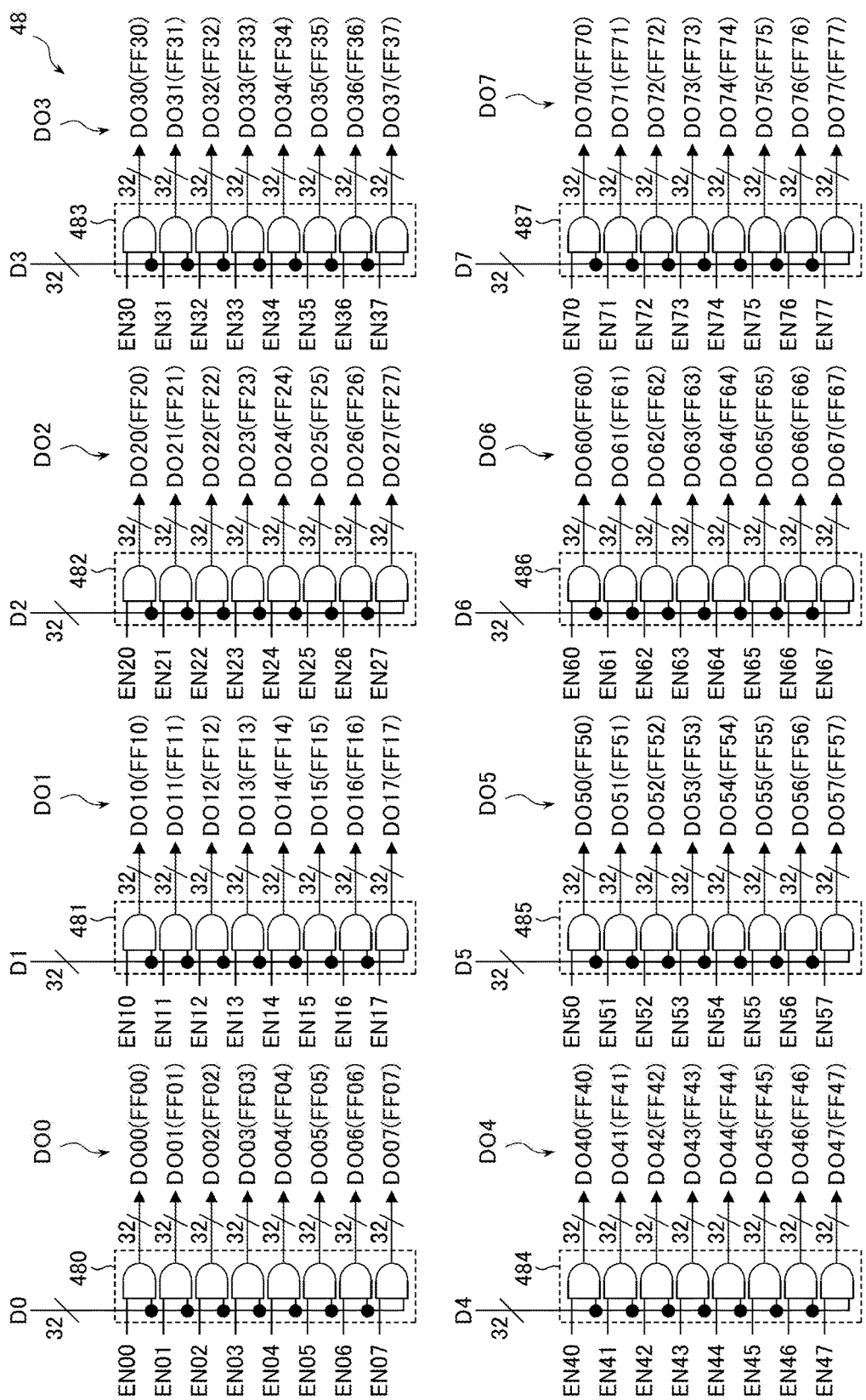
FIG. 9 depicts an example of a register input selector unit depicted in FIG. 6.

The register input selector unit 48 selects data received from the register unit 22 through the data lines D0 to D7 32 bits by 32 bits in response to the enable signals EN00 to EN77 and outputs the selected data to the transposition buffer 50 through a data line DO (DO0 to DO7). Each of the data lines DO0 to DO7 is a 256-bit (32 bits×8) line. An example of the register input selector unit 48 is depicted in FIG. 9, and an example of operation of the register input selector unit 48 is depicted in FIG. 17.

Figure 10:
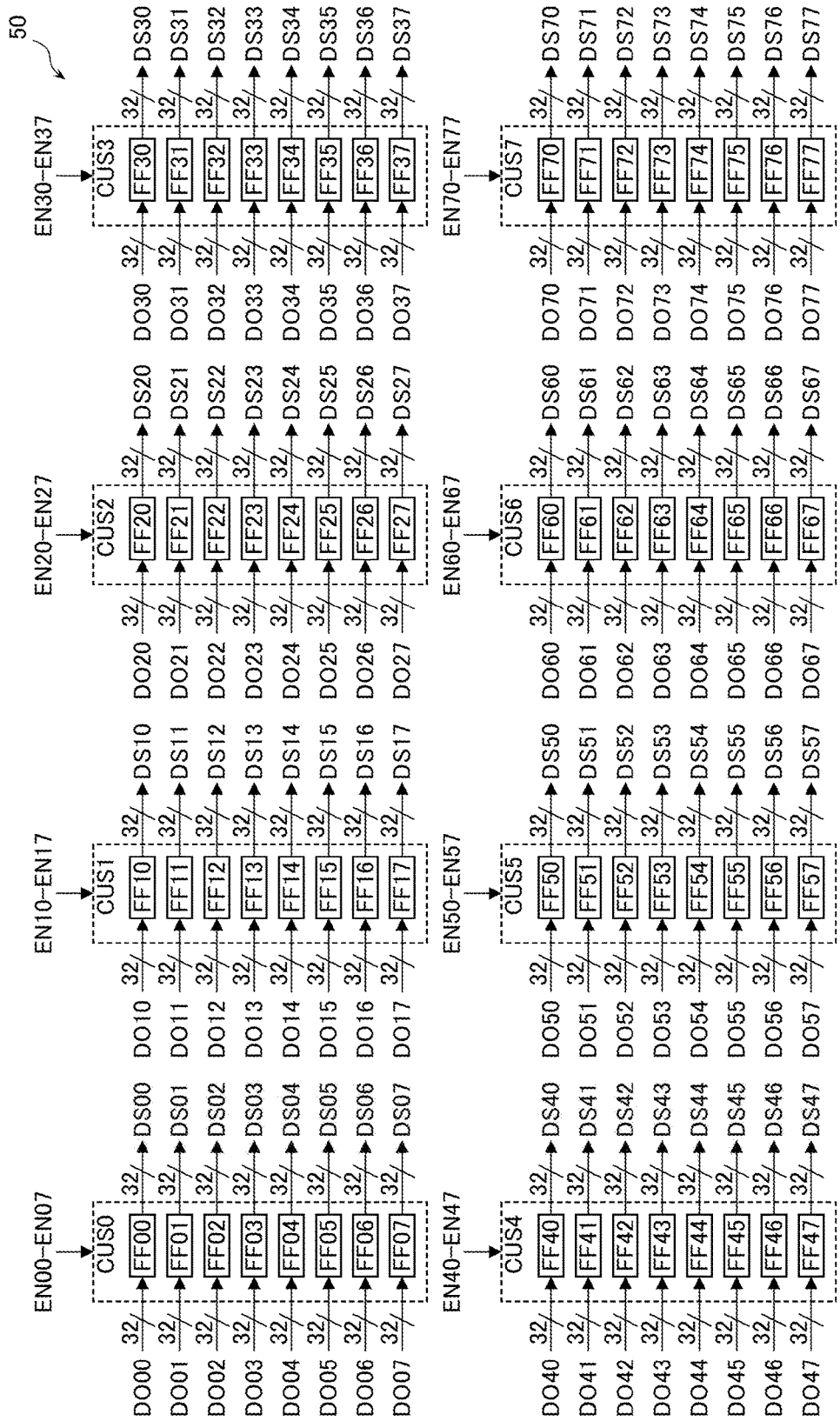
FIG. 10 depicts an example of another transposition buffer depicted in FIG. 6.

The transposition buffer 50 retains data of 2048 bits successively received through the register input selector unit 48 in accordance with the store instruction st and outputs the retained data 256 bits by 256 bits to data lines DS (DS0 to DS7). An example of the transposition buffer 50 is depicted in FIG. 10. The data line DS0 indicates data lines DS00 to DS07; the data line DS1 indicates data lines DS10 to DS17; the data line DS2 indicates data lines DS20 to DS27; and the data line DS3 indicates data lines DS30 to DS37. The data line DS4 indicates data lines DS40 to DS47; the data line DS5 indicates data lines DS50 to DS57; the data line DS6 indicates data lines DS60 to DS67; and the data line DS7 indicates data lines DS70 to DS77. Each of the data lines DS00 to DS77 is a 32-bit line.

The memory output selector unit 52 selects one of data of 256 bits outputted from the transposition buffer 50 to the data lines DS0 to DS7 in response to the selection signal SEL and outputs the selected data to the memory bus MB (MB0 to MB7). For example, the selection signal SEL is a 4-bit signal, and when the most significant one bit is valid, one of the data lines DS0 to DS7 is selected in response to the logic of the lower 3 bits.

FIG. 7 depicts an example of the memory input selector unit and the transposition buffer depicted in FIG. 6. The transposition buffer 42 includes eight column units CUL (CUL0 to CUL7) each retaining data of 256 bits supplied through the memory input selector unit 40. Each column unit CUL may be an example of a first memory area. Each column unit CUL includes retention circuits FF divided into eight control units, and each retention circuit FF retains data of 32 bits and outputs the retained data to a data line DL. For example, each retention circuit FF of one control unit includes 32 flip-flops for retaining data and so forth. The value of an upper one of two digits applied to the end of each retention circuit FF and each data line DL represents the number of the column unit CUL and the value of the lower digit indicates the number of a memory bus MB to which data is supplied.

The memory input selector unit 40 includes a logic circuit that output data of 256 bits on the memory bus MB to one of the column units CUL in response to the logics of the enable signals EN0 to EN7. The digit applied to the end of each enable signal EN indicates the number of the column unit CUL. In FIG. 7, every time data is transferred to the memory bus MB, one of the enable signals EN0 to EN7 is set to the logic 1. When the enable signal EN0 indicates the logic 1, the data on the memory bus MB is stored into the column unit CUL0, and when the enable signal EN1 indicates the logic 1, the data is stored into the column unit CUL1. Each retention circuit FF in each column unit CUL latches, when the corresponding enable signal EN indicates the logic 1, data in synchronism with a clock signal.

FIG. 8 depicts an example of the register output selector unit depicted in FIG. 6. The register output selector unit 44 includes eight selectors 440 to 447 corresponding to the column units CUL0 to CUL7 depicted in FIG. 7. The selectors 440 to 447 are an example of a second selector unit. The digit at the end of each of the selectors 440 to 447 indicates the number of a column unit CUL coupled through a data line DL, the number of one of the selection signals SEL0 to SEL7 received and the number of one of the data lines D0 to D7 to which data is outputted. For example, the selector 440 selects one of data of 32 bits supplied to each of the eight data lines DL0° to DL07 in response to the value of the lower 3 bits of the selection signal SEL0 and outputs the selected data to the data line D0. When the logic of the most significant bit of the selection signal SEL0 indicates an invalid state, the selector 440 stops outputting of data to the data line D0, and the data line D0 outputs 0. The other selectors 441 to 447 operate similarly to the selector 440.

FIG. 9 depicts an example of the register input selector unit depicted in FIG. 6. The register input selector unit 48 includes eight selectors 480 to 487 coupled to the data lines D0 to D7 depicted in FIG. 6, respectively. The selectors 480 to 487 may be an example of a third selector unit. The digit at the end of each of the selectors 480 to 487 indicates the number of one of the data lines D0 to D7. For example, the selector 480 outputs data of 32 bits received from the data line D0 to one of the data lines DO00 to DO07 in response to the logic of the enable signals EN00 to EN07. One of the enable signals EN00 to EN07 is set to the logic 1 every time data is supplied to the data line D0. The other selectors 481 to 487 operate similarly to the selector 480. It is to be noted that the two digits at the end of the data line DO indicates the number of the retention circuit FF provided in the transposition buffer 50 depicted in FIG. 10.

FIG. 10 depicts an example of another transposition buffer depicted in FIG. 6. The transposition buffer 50 includes eight column units CUS (CUS0 to CUS7) that each retain data of 256 bits supplied through the data line DO. The column units CUS are an example of a second memory area. Each column unit CUS includes eight retention circuits FF similarly to the column unit CUL depicted in FIG. 7, and each of the eight retention circuits FF retains data of 32 bits and outputs the retained data to the data line DS. Although the number of each retention circuit FF of the transposition buffer 50 overlaps with the number of each retention circuit FF of the transposition buffer 42 depicted in FIG. 7, the retention circuits FF of the transposition buffer 50 and the retention circuits FF of the transposition buffer 42 depicted in FIG. 7 may be retention circuits that are physically different from each other.

Each of the retention circuits FF00 to FF77 of the column units CUS0 to CUS7 latches data in synchronism with a clock signal when one of the enable signals EN00 to EN77 having a same digit at the end indicates the logic 1. For example, the retention circuit FF00 latches data when the enable signal EN00 indicates the logic 1, and the retention circuit FF10 latches data when the enable signal EN10 indicates the logic 1. In FIG. 10, the upper one of the two digits applied to the end of the individual retention circuits FF, data lines DO and data lines DS indicates the number of the column unit CUS, and the lower one of the two digits indicates the number of the memory bus MB to which data is outputted.

Figure 11:
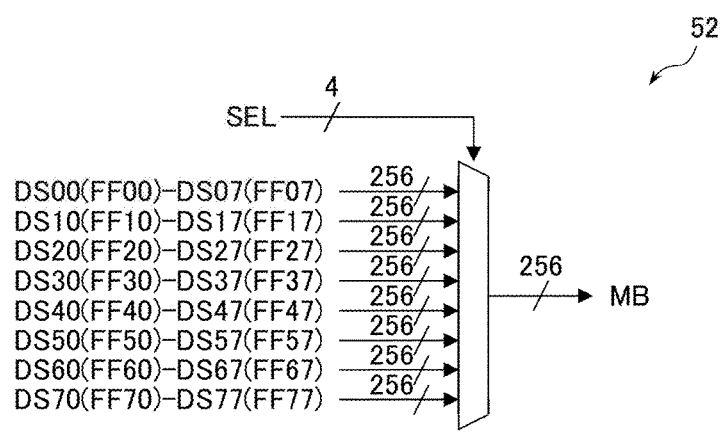
FIG. 11 depicts an example of a memory output selector unit depicted in FIG. 6.

FIG. 11 depicts an example of the memory output selector unit depicted in FIG. 6. The memory output selector unit 52 selects one of data of 256 bits supplied to the data line DS in response to the value of the lower 3 bits of the selection signal SEL and outputs the selected data to the memory bus MB. For example, when the lower 3 bits of the selection signal SEL indicate "2," the memory output selector unit 52 outputs data of 256 bits supplied to the data lines DS20 to DS27 to the memory bus MB. When the lower 3 bits of the selection signal SEL indicate "6," the memory output selector unit 52 outputs data of 256 bits supplied to the data lines DS60 to DS67 to the memory bus MB. It is to be noted that, when the logic of the most significant bit of the selection signal SEL indicates an invalid state, the memory output selector unit 52 stops outputting of data to the memory bus MB, and the memory bus MB outputs the 0 level.

FIG. 12 depicts an example of the register unit depicted in FIG. 5. The register unit 22 includes register files RF0 to RF7 coupled to the register buses RB0 to RB7, respectively. Each of the register files RF0 to RF7 includes a plurality of storage regions for storing data of 32 bits. In FIG. 12, a word WL (WL0 to WL7: corresponding to word WL depicted in FIG. 13) is constructed from eight storage regions of 32 bits arranged in a horizontal direction. An example of an internal structure of the register files RF0 to RF7 is depicted in FIG. 13.

Writing of data into the register unit 22 in accordance with the load instruction ld is executed, for example, for each word WL, and readout of data from the register unit 22 in accordance with the store instruction st is executed for each word WL. The arithmetic operation execution unit 20 depicted in FIG. 5 executes, for example, an arithmetic operation for each data stored in one of the words WL. This is because the arithmetic operation execution unit 20 reads out data for each word WL through the register buses RB. At this time, it is possible to take out one data from each of the register buses RB0 to RB7 at the same time.

Therefore, when eight data are taken out at one time, one data is extracted from each of the register buses RB0 to RB7. For example, data of a plurality of words WL is not taken out from one register bus RB. In such a case, data that may be arithmetically operated simultaneously may be arranged in the register files RF by storing data in a transposed relation into the register files RF.

FIG. 13 depicts an example of the register file depicted in FIG. 12. Since the register files RF0 to RF7 include a same structure with each other, the register file RF0 is described below.

The register file RF0 includes memory cells MC of a static random access memory (SRAM) arranged in a matrix, a word decoder WDEC, a read/write controlling circuit RWC, a write amplifier WA and a read amplifier RA. The memory cells MC arrayed in a horizontal direction in FIG. 13 are each coupled to one of 1024 word lines WL (WL0, WL1, WL2, . . . , and WL1023), and the memory cells MC arranged in a vertical direction in FIG. 13 are each coupled to one of 32 sets of bit line pairs BL and /BL (BL0 and /BL0, BL1 and /BL1, . . . , and BL31 and /BL31). In the register files RF0 to RF7, memory cells MC coupled to word lines WL having a same number with each other belong to the same word WL. The number of word lines WL is not limited to 1024.

The word decoder WDEC drives (selects) one of the word lines WL based on a register address raddr designated by the load instruction ld, store instruction st or the like and the selection signal SEL0 or an enable signal EN00 to EN07. The register address raddr indicates the number of a word line WL with which access is started, and the value of the selection signal SEL0 and the enable signals EN00 to EN07 indicate a relative position from the word line WL with which access is started.

For example, when the register address raddr indicates the word line WL0 and the selection signal SEL0 indicates "1," the word decoder WDEC selects the word line WL1. When the register address raddr indicates the word line WL1 and the selection signal SEL0 indicates "1," the word decoder WDEC selects the word line WL2. When the register address raddr indicates the word line WL0 and the enable signal EN01 is received, the word decoder WDEC selects the word line WL1. When the register address raddr indicates the word line WL1 and the enable signal EN01 is received, the word decoder WDEC selects the word line WL2. The word decoder WDEC of the other register files RF1 to RF7 operates similarly to the word decoder WDEC of the register file RF0 except that the selection signals SEL0 to SEL7 and the enable signals EN00 to EN77 received are different.

By supplying the selection signals SEL0 to SEL7 different from each other to the register files RF0 to RF7, respectively, the timings at which transposed data are written into the memory cells MC coupled to the respective word lines WL of the register files RF0 to RF7 may be controlled independently of each other as depicted in FIG. 15. By supplying the enable signals EN00 to EN77 different from each other to the register files RF0 to RF7, respectively, the timings at which data are read out from the memory cells MC coupled to the respective word lines WL of the register files RF0 to RF7 may be controlled independently of each other as depicted in FIG. 17. Accordingly, the circuit for generating control signals for controlling operation of the register files RF0 to RF7 may be simplified in comparison with that in an alternative case in which the memory cells MC coupled to the word lines WL, the selection signals SEL0 to SEL7 and the enable signals EN00 to EN77 are not used.

Each memory cell MC includes a storage node MN having a pair of inverters coupled such that an output of one of the inverters is coupled to an input of the other one of the inverters and an output of the other one of the inverters is coupled to an input of the one of the inverters, and further includes transfer transistors T1 and T2 that couple the storage node MN to the bit lines BL and /BL. When the word line WL coupled to the memory cell MC is driven (for example, to the high level), the transfer transistors T1 and T2 couple one end of the storage node MN to the bit line BL and couple the other end of the storage node MN to the bit line /BL. In a writing operation for writing data into the memory cell MC, the logic 0 or the logic 1 is written into the storage node MN based on the logic of complementary data on the bit lines BL and /BL. In a reading out operation for reading out data from the memory cell MC, the logic stored in the storage node MN and the inverted logic are read out to the bit lines BL and /BL, respectively.

The read/write controlling circuit RWC outputs a write enable signal WREN in response to reception of the selection signal SEL0 and outputs a read enable signal RDEN in response to reception of one of the enable signals EN00 to EN07. The read/write controlling circuit RWC in each of the other register files RF1 to RF7 operates similarly to the read/write controlling circuit RWC of the register file RF0 except that the selection signals SEL0 to SEL7 and the enable signals EN00 to EN77 received are different.

The write amplifier WA outputs data of 32 bits received from the register bus RB0 as complementary data to the 32 bit line pairs BL and /BL in response to the write enable signal WREN. The read amplifier RA outputs data of 32 bits outputted from the memory cells MC to the 32 bit line pairs BL and /BL to the register bus RB0 in response to the read enable signal RDEN. To each of the bit line pairs BL and /BL, a sense amplifier for amplifying the potential difference between the bit line pairs BL and /BL may be coupled.

FIG. 14 depicts an example of operation of the memory input selector unit depicted in FIG. 7. For example, FIG. 14 depicts an example of a control method of the arithmetic processing apparatus 110. In FIG. 14, data #0 to #63 of 2048 bits are read out successively twice from the memory 210 in accordance with two load instructions Id. For example, each load instruction Id designates the transfer length length indicated in the expression (1) to 256 bytes. The load/store engine 16 depicted in FIG. 5 repeats twice an operation for successively outputting 256 bits (data group) from among the data #0 to #63 read out from the memory 210 for each cycle (cycle 0 to cycle 7 and cycle 8 to cycle 15). Each of the data #0 to #63 includes 32 bits. Further, the load/store engine 16 outputs a valid signal LVALID not depicted together with each data group in accordance with an instruction from the state machine 14. The cycle indicates a clock cycle.

Every time the buffer input controller 34A receives a valid signal LVALID, it successively outputs one of enable signals EN0 to EN7 and outputs a transfer start signal TS1 when the valid signal LVALID is received. The memory input selector unit 40 outputs data of 256 bits successively received through the memory buses MB (MB0 to MB7) to one of the column units CUL0 to CUL7 in synchronism with each of the enable signals EN0 to EN7. Using eight cycles, the data #0 to #63 of 2048 bits of eight data groups are stored into the column units CUL0 to CUL7 for the individual data groups.

The number of each of the retention circuits FF into which the data #0 to #63 are stored is indicated, in FIG. 14, at the upper side or the lower side of the data #0 to #63 transmitted to the memory buses MB0 to MB7. For example, the first data group #0 to #7 is stored into the column unit CUL0; the second data group #8 to #15 is stored into the column unit CUL1; and the third data group #16 to #23 is stored into the column unit CUL2.

FIG. 15 depicts an example of operation of the register output selector unit depicted in FIG. 8. For example, FIG. 15 depicts an example of a control method of the arithmetic processing apparatus 110. The operation depicted in FIG. 15 is executed in parallel to the operation depicted in FIG. 14. For example, FIG. 15 depicts operation of the register output selector unit 44 executed in accordance with two load instructions Id.

The buffer output controller 36A depicted in FIG. 6 outputs, in response to that a transfer start signal TS1 is received from the buffer input controller 34A, a selection signal SEL0 indicating "0" to "7" to the selector 440 depicted in FIG. 8 for each cycle. The buffer output controller 36A outputs a selection signal SEL1 indicating "0" to "7" to the selector 441 depicted in FIG. 8 for each cycle in response to reception of the second transfer start signal TS1. The buffer output controller 36A successively outputs each of the selection signals SEL2 to SEL7 indicating "0" to "7" to the selectors 442 to 447 depicted in FIG. 8 based on the counter 38A activated in response to the transfer start signal TS1. Thereafter, the buffer output controller 36A starts operation for successively outputting selection signals SEL0 to SEL7 indicating "0" to "7" to the selectors 440 to 447 in response to the transfer start signals TS1 successively received over the cycle 9 to the cycle 16.

The selector 440 successively selects the data #0 to #7 outputted from the column unit CUL0 in response to the value of the selection signal SEL0 and outputs the selected data #0 to #7 to the data line D0. The selector 441 successively selects the data #8 to #15 outputted from the column unit CUL1 in response to the value of the selection signal SEL1 and outputs the selected data #8 to #15 to the data line D1. Similarly, the selectors 442 to 447 successively select data outputted from the column units CUL2 to CUL7 in response to the value of the corresponding selection signals SEL2 to SEL7 and output the selected data to one of the data lines D2 to D7.

The data lines D0 to D7 are coupled to the register buses RB0 to RB7, respectively, by the crossbar switch 46 depicted in FIG. 6. As described with reference to FIG. 13, each of the register files RF0 to RF7 generate a write enable signal WREN in response to the respective selection signals SEL0 to SEL7. Therefore, the data outputted to each of the data lines D0 to D7 is stored into the respective register files RF0 to RF7 through the respective register buses RB0 to RB7. In each of the register files RF0 to RF7, the region into which data of 32 bits is stored is determined based on the register address raddr included in the load instruction Id and the values of the selection signals SEL0 to SEL7. For example, since the register addresses raddr included in the first and second load instructions Id are different from each other, the data are stored into memory cells MC coupled to the respective word lines WL which are different form each other.

As depicted in FIG. 14, the first data #0 to #7 from among the data of 2048 bits supplied in accordance with the second load instruction Id are stored into the column unit CUL0 in the cycle 8. In each of the retention circuits FF of the column units CUL0 to CUL7, writing of data is executed after reading out of data. For example, the data #0 to #7 from among the data of 2048 bits supplied first have been transferred to the register file RF0 before the cycle 8, data overwriting does not occur. Similarly, in the cycle 9, since the first data #8 to #15 retained by the column unit CUL1 are transferred to the register file RF1 before the second data #8 to #15 are stored into the column unit CUL1, overwriting of data does not occur. Also in regard to any other column unit CUL, first data are transferred to the register file RF before second data are stored.

Therefore, also where data supplied in accordance with a plurality of load instructions Id are stored into the transposition buffer 42 successively without a break, it is possible to transpose data without losing data and store the transposed data into the register files RF0 to RF7. For example, it is possible to transpose data, which are supplied successively in accordance with a plurality of load instructions Id, for example, using the single transposition buffer 42 that retains data of 2048 bits corresponding to one load instruction Id.

The operation for transposing data corresponding to a plurality of load instructions Id using the single transposition buffer 42 is made possible by generating values of the selection signals SEL0 to SEL7 respectively corresponding to the selectors 440 to 447 in a displaced relation from each other. Consequently, the selectors 440 to 447 that operate receiving the selection signals SEL0 to SEL7 may select data groups retained in the respective column units CUL0 to CUL7 in the cycles displaced from each other.

By successively outputting data included in data groups in cycles beginning with a cycle next to a cycle in which the data groups are retained into the transposition buffer 42, also in a case in which the data are outputted in a displaced relation, it is possible to store the data into the register files RF0 to RF7 in a minimized number of cycles. For example, after each data group is retained into the transposition buffer 42, transfer of the data to the register files RF may be completed in eight cycles. It is possible to make the data transfer rate when data are successively stored into the register unit 22 in response to a plurality of load instructions Id equal to the data transfer rate by a transposition unit 18C including two transposition buffers 42a and 42b indicated in FIG. 22 hereinafter described.

Figure 16:
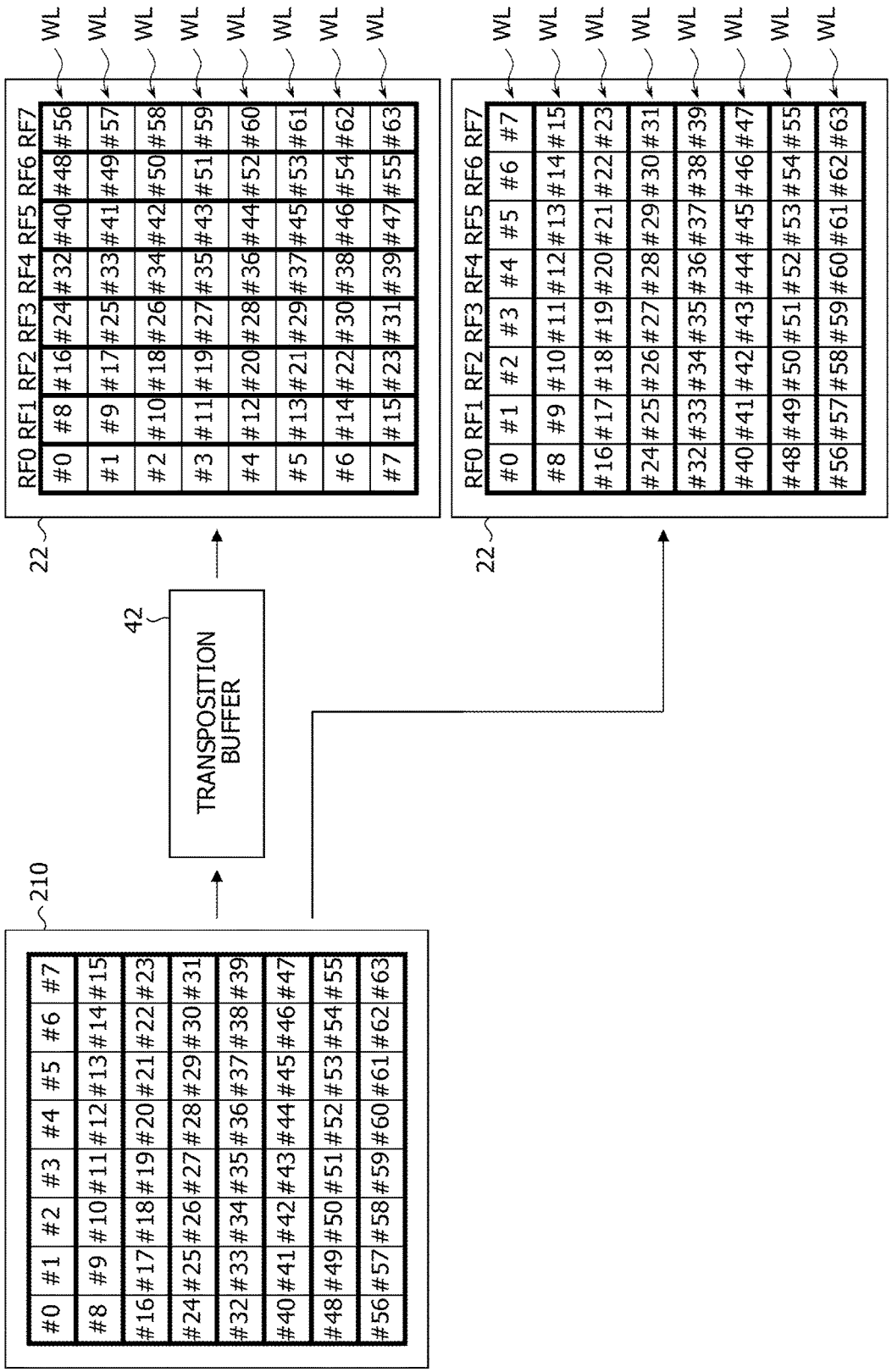
FIG. 16 depicts an example of operation of a processor core depicted in FIG. 5 upon execution of a load instruction.

FIG. 16 depicts an example of operation of the processor core 120 depicted in FIG. 5 upon execution of a load instruction Id. For example, data #0 to #63 are stored in the memory 210, and the data #0 to #7, #8 to #15, #16 to #23, #24 to #31, #32 to #39, #40 to #47, #48 to #55 and #56 to #63 are successively read out in a unit indicated by a thick frame from the memory 210.

When the transposition flag trans described in the operand of the load instruction Id is "1," data of 2048 bits read out from the memory 210 are stored into the register unit 22 through the transposition buffer 42. In this case, into the register unit 22, data of an array transposed from the array of the data stored in the memory 210 are retained as indicated in a right upper portion in FIG. 16. For example, in the register unit 22, data groups of thick frames read out from the memory 210 are stored into the register files RF0 to RF7. The register unit 22 into which data supplied from the transposition buffer 42 are stored may be an example of a first register unit, and the register files RF0 to RF7 including words WL into which data supplied from the transposition buffer 42 are stored may be an example of a first register file.

When the transposition flag trans described in the operand of the load instruction Id is "0," data of 2048 bits read out from the memory 210 are stored into the register unit 22 without intervention of the transposition buffer 42. In this case, as indicated in a right lower portion in FIG. 16, into the register unit 22, data that maintain the array of the data stored in the memory 210 are retained. For example, into the register unit 22, data groups of units of a thick frame read out from the memory 210 are retained in a distributed manner into the register files RF0 to RF7 of one word WL.

The data stored in the register unit 22 are used in an arithmetic operation executed, for example, in accordance with an arithmetic instruction. By the arithmetic instruction, data of 32 bits retained in the register files RF0 to RF7 are individually transferred to eight arithmetic units, by which an arithmetic operation of the data is executed with data of 32 bits retained in different words WL of the register files RF0 to RF7. Where the data are data of 2048 bits, an arithmetic operation is executed by eight times. A result of execution of each arithmetic operation is stored into different words WL of the register files RF0 to RF7.

An arithmetic operation by the eight arithmetic units is executed using data of 256 bits retained in each of the register files RF0 to RF7. Therefore, where individual target data by the eight arithmetic operations are #0 to #7, #8 to #15, . . . , and #56 to #63, data read out from the memory 210 are stored into the register files RF0 to RF7 without being transposed. On the other hand, when the target data of the arithmetic operation are #0, #8, #16, #24, #32, #40, #48, #56 and so forth, data read out from the memory 210 are transposed by the transposition buffer 42 and stored into the register files RF0 to RF7.

FIG. 17 depicts an example of operation of the register input selector unit depicted in FIG. 9. For example, FIG. 17 depicts an example of a control method of the arithmetic processing apparatus 110. In the example depicted in FIG. 17, data #0 to #63 of 2048 bits are successively read out twice from the register unit 22 in response to two store instructions st. In the following, reading out of data #0 to #63 of 2048 bits from the register unit 22 in accordance with the first store instruction st is described. Also reading out of the data #0 to #63 of 2048 bits from the register unit 22 in accordance with the second store instruction st is executed similarly.

The load/store engine 16 depicted in FIG. 5 outputs a valid signal SVALID in accordance with an instruction from the state machine 14 at a timing at which the transposition unit 18 receives first data. The buffer input controller 34B successively outputs enable signals EN00 to EN07 in response to reception of the first valid signal SVALID and successively outputs enable signals EN10 to EN17 in response to reception of the valid signal SVALID.

Thereafter, every time the valid signal SVALID is received, the buffer input controller 34B successively outputs enable signals EN00 to EN07, EN10 to EN17, EN20 to EN27, EN30 to EN37, EN40 to EN47, EN50 to EN57, EN60 to EN67, and EN70 to EN77. The buffer input controller 34B outputs a transfer start signal TS2 (FIG. 6) to the buffer output controller 36B together with the enable signal EN07.

The enable signals EN00 to EN77 are supplied also to the register files RF0 to RF7 as described with reference to FIG. 13 and are used also for operation for reading out data from given words WL (FIG. 12) of the register files RF0 to RF7. Data read out from the given words WL of the register files RF0 to RF7 are supplied to the data lines D0 to D7 through the register buses RB0 to RB7. In the register files RF0 to RF7, a word WL from which data are read out in accordance with a store instruction st is an example of a second register file, and the register unit 22 including the second register file is an example of a second register unit.

The register input selector unit 48 successively stores the data #0 to #7 supplied to the data line D0 into the retention circuits FF00 to FF07 of the transposition buffer 50 in accordance with the enable signals EN00 to EN07. The register input selector unit 48 successively stores the data #8 to #15 supplied to the data line D1 into the retention circuits FF10 to FF17 of the transposition buffer 50 in accordance with the enable signals EN10 to EN17. Similarly, the register input selector unit 48 successively stores the data #16 to #63 supplied to the respective data lines D2 to D7 into the retention circuits FF30 to FF77 of the transposition buffer 50 in accordance with the enable signals EN20 to EN77. The number of each of the retention circuits FF into which each of the data #0 to #63 is stored is indicated at the upper side or the lower side of the data #0 to #63 transmitted to the data lines D0 to D7 in FIG. 17.

FIG. 18 depicts an example of operation of the memory output selector unit depicted in FIG. 11. For example, FIG. 18 depicts an example of a control method of the arithmetic processing apparatus 110. The operation depicted in FIG. 18 is executed in parallel to the operation depicted in FIG. 17. The buffer output controller 36B depicted in FIG. 6 successively outputs selection signals SEL indicating "0" to "7" in response to reception of a transfer start signal TS2 from the buffer input controller 34B. The buffer output controller 36B may include a counter for generating the selection signals SEL.

The memory output selector unit 52 outputs the data #0 to #7 retained in the retention circuits FF00 to FF07 of the transposition buffer 50 to the memory buses MB (MB0 to MB7) in accordance with the selection signal SEL0. The memory output selector unit 52 outputs the data #8 to #15 retained in the retention circuits FF10 to FF17 of the transposition buffer 50 to the memory buses MB in response to the selection signal SEL1. Similarly, the memory output selector unit 52 successively outputs the data #16 to #63 retained in the retention circuits FF20 to FF77 of the transposition buffer 50 to the memory buses MB in accordance with the selection signals SEL2 to SEL7. The number of each of the retention circuits FF into which each of the data #0 to #63 is stored is indicated at the upper side or the lower side of the data #0 to #63 transmitted to the memory buses MB0 to MB7 in FIG. 18. The data #0 to #63 retained in the transposition buffer 50 are written into the memory 210 by the memory controller 130.

In FIG. 17, in each of the retention circuits FF of the transposition buffer 50, writing of data is executed after reading out of data. Therefore, the data group #0 to #7 successively read out from the register unit 22 in accordance with the first store instruction st are outputted from the transposition buffer 50 before the data #0 is read out from the register unit 22 in the cycle 8 in accordance with the second store instruction st. Similarly, the data group #8 to #15 successively read out from the register unit 22 in accordance with the first store instruction st are outputted from the transposition buffer 50 before the data #8 is read out from the register unit 22 in the cycle 9 in accordance with the second store instruction st. Also the other data groups successively read out from the register unit 22 in accordance with the first store instruction st are outputted from the transposition buffer 50 before data are read out from the register unit 22 in accordance with the second store instruction st.

Accordingly, also when data are read out without a break from the register unit 22 and are transposed in accordance with a plurality of store instructions st, read out data may be written into the memory 210 through the transposition buffer 50 without being lost. For example, data successively read out from the register unit 22 in accordance with a plurality of store instructions st may be transposed using the single transposition buffer 50 that retains data of 2048 bits corresponding to one store instruction st.

The operation for transposing data corresponding to a plurality of store instructions st using the single transposition buffer 50 may be achieved by generating the enable signals EN00 to EN77 corresponding to the respective selectors 480 to 487 in a displaced relation from each other. This makes it possible for the selectors 480 to 487, which operate in response to the enable signals EN00 to EN77, to select data to be read out from the register unit 22 in cycles displaced from each other.

The memory output selector unit 52 outputs each data group to the memory buses MB in a cycle next to the cycle in which storage of data included in each of the data groups into the transposition buffer 50 is completed. Consequently, also when data are successively read out from the register unit 22 in cycles displaced from each other, the data may be written into the memory 210 in a minimized number of cycles. For example, each data group may be written into the memory 210 after eight cycles after the first data of the data group is read out from the register unit 22. For example, the data transfer rate when data are successively read out from the register unit 22 in accordance with a plurality of store instructions st may be equal to the data transfer rate by the transposition unit 18C that includes two transposition buffers 50a and 50b depicted in FIG. 22 hereinafter described.

The operation for transposing the array of data read out from the register files RF0 to RF7 and storing the data into the memory 210 may be explained by replacing the transposition buffer 42 of FIG. 16 into the transposition buffer 50 and reversing the direction of arrow marks between the memory 210 and the register unit 22.

Figure 19:
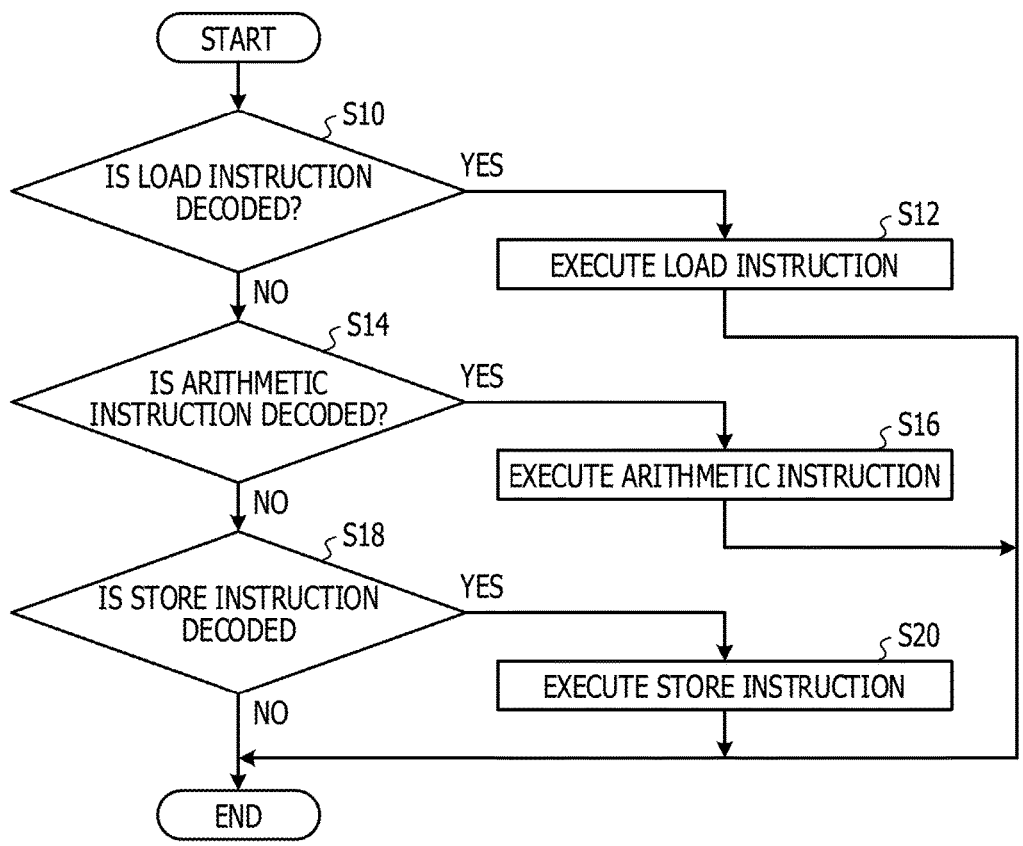
FIG. 19 depicts an example of operation of the arithmetic processing apparatus depicted in FIG. 5.

FIG. 19 depicts an example of operation of the arithmetic processing apparatus depicted in FIG. 5. For example, FIG. 19 depicts an example of a control method of the arithmetic processing apparatus 110. A flow depicted in FIG. 19 is started in response to decoding of an instruction by the decoder 12 depicted in FIG. 5. If the decoder 12 decodes a load instruction Id in operation S10, the operation is advanced to operation S12, but if the decoder 12 does not decode a load instruction Id, the operation is advanced to operation S14.

Figure 20:
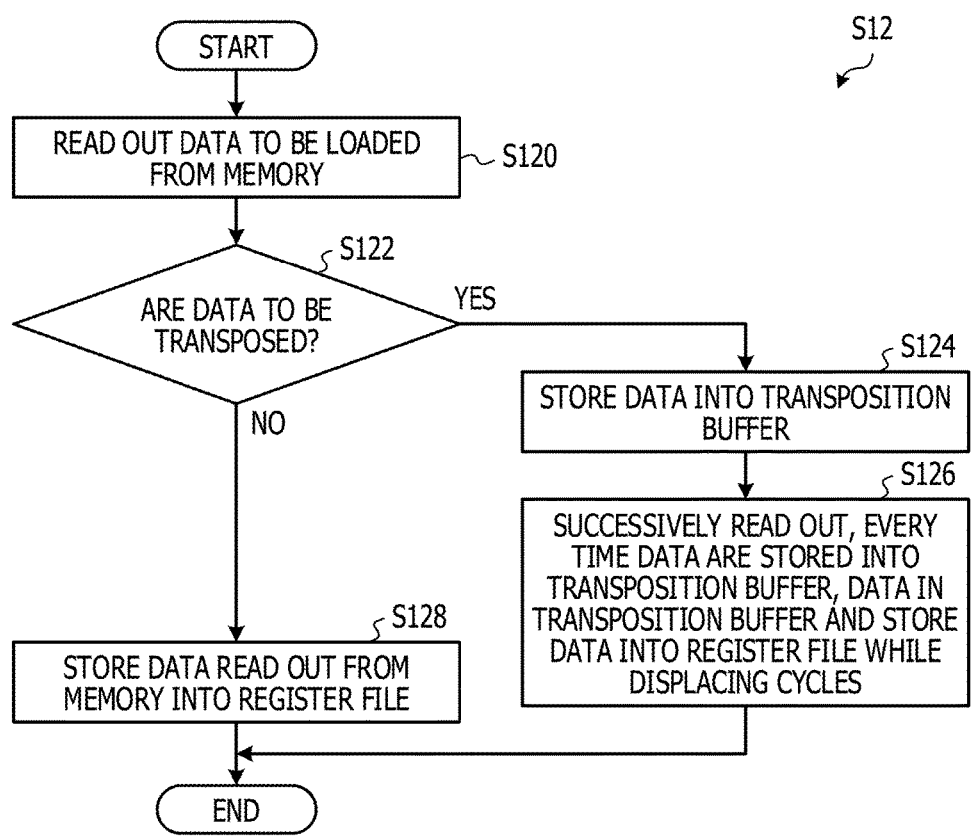
FIG. 20 depicts an example of operation of a load instruction executed in operation S12 in FIG. 19.

In operation S12, the processor core 120 depicted in FIG. 5 executes the load instruction Id and ends its operation. An execution flow of the load instruction Id by in operation S12 is depicted in FIG. 20. If the decoder 12 decodes an arithmetic instruction in operation S14, the operation is advanced to operation S16, but if the decoder 12 does not decode an arithmetic instruction, the operation is advanced to operation S18. In operation S16, the processor core 120 depicted in FIG. 5 executes the arithmetic instruction and ends the operation.

Figure 21:
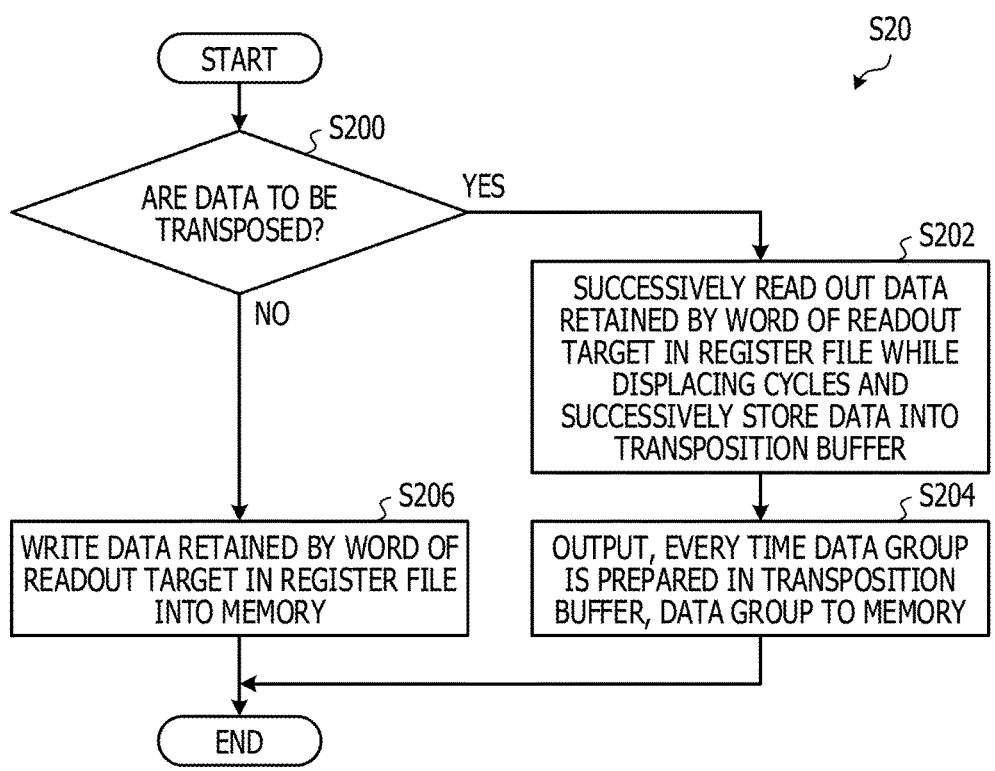
FIG. 21 depicts an example of operation of a store instruction executed in operation S20 of FIG. 19.

If the decoder 12 decodes a store instruction st in operation S18, the operation is advanced to S20, but if the decoder 12 does not decode a store instruction st, the operation is ended. In operation S20, the processor core 120 depicted in FIG. 5 executes the store instruction st and ends the operation. An execution flow of the store instruction st in operation S20 is depicted in FIG. 21.

FIG. 20 depicts an example of an operation flow of the load instruction ld executed in S12 of FIG. 19. First, in operation S120, the load/store engine 16 depicted in FIG. 5 reads out data to be loaded from the memory 210. After operation S120, the operation is advanced to operation S122.

If data are to be transposed in operation S122, the operation is advanced to operation S124, but if data are not to be transposed, the operation is advanced to operation S128. In operation S124, the transposition unit 18 depicted in FIG. 6 successively stores the data read out from the memory 210 into the transposition buffer 42. In operation S126, every time the transposition unit 18 stores data into the transposition buffer 42, it successively reads out the data stored in the transposition buffer 42 in cycles displaced from each other and stores the data into the register files RF0 to RF7. The data are transposed in the process in which they are stored into the register unit 22 through the transposition buffer 42. As depicted in FIGS. 14 and 15, the operations in operations S124 and S126 are executed in parallel. After operations S124 and S126, the operation is ended.

In operation S128, the transposition unit 18 stores the data read out from the memory 210 in order to use them for an arithmetic operation into the register files RF0 to RF7 through the bypass route BYPS, and ends the operation.

FIG. 21 depicts an example of an operation flow of a store instruction executed in operation S20 of FIG. 19. When data are to be transposed in operation S200, the operation is advanced to operation S202, but when data are not to be transposed, the operation is advanced to operation S206. In operation S202, the transposition unit 18 depicted in FIG. 6 successively reads out data retained by the word WL of a readout target in the register files RF0 to RF7 in cycles displaced from each other and stores the read out data into the transposition buffer 50.

In operation S204, the transposition unit 18 outputs, every time a data group is prepared in the transposition buffer 50, the data group to the memory 210. As depicted in FIGS. 17 and 18, the operations in operations S202 and S204 are executed in parallel. After operations S202 and S204, the operation is ended.

In operation S206, the transposition unit 18 reads out data retained by the word WL of a readout target in the register files RF0 to RF7 and writes the read out data into the memory 210 through the bypass route BYPS, and ends the operation.

Figure 22:
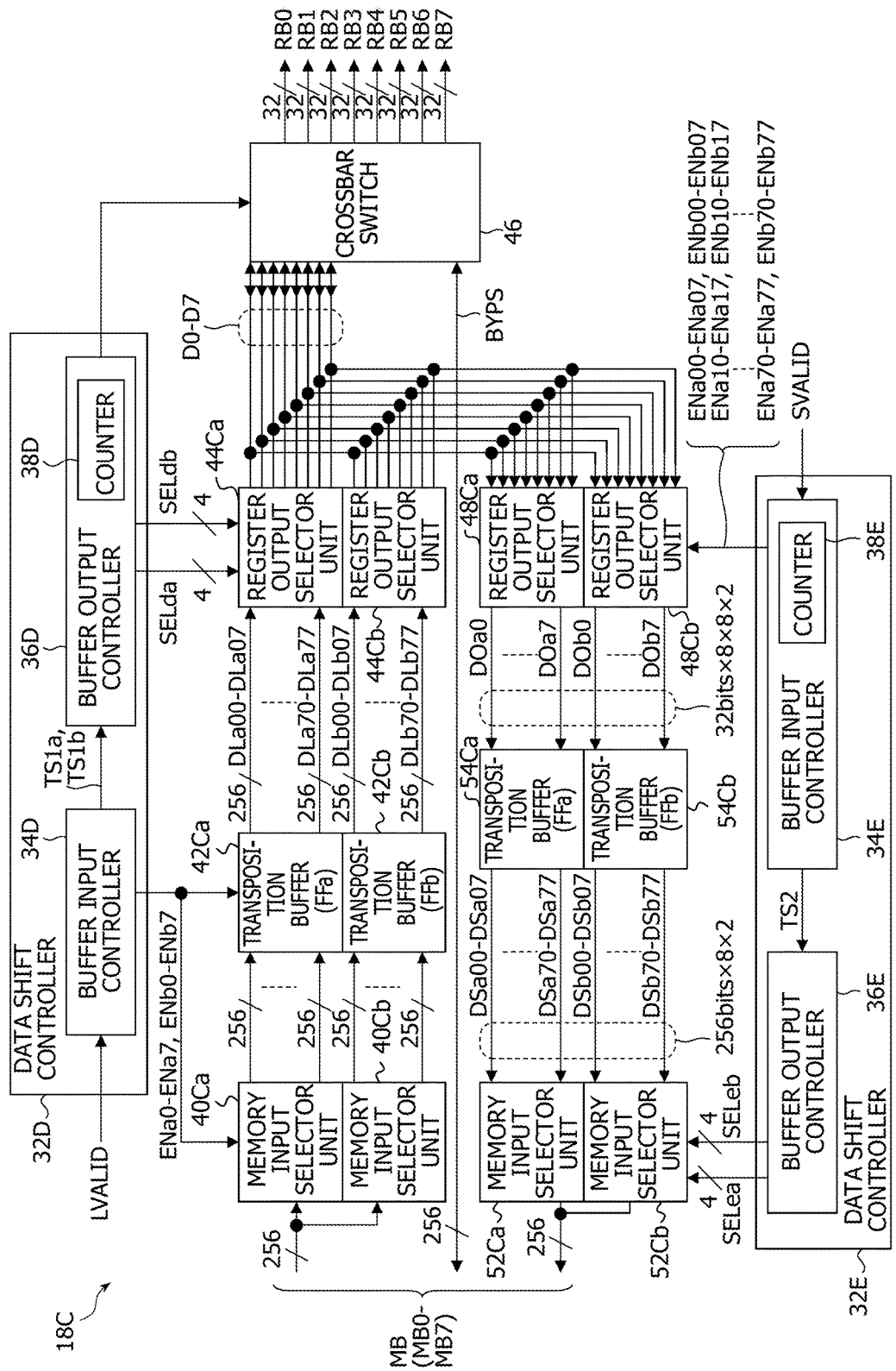
FIG. 22 depicts another example of a transposition unit.

FIG. 22 depicts another example of a transposition unit. The same elements as those in FIG. 6 are denoted by the same reference symbols and detailed description of the same is omitted. For example, the transposition unit 18C depicted in FIG. 22 is incorporated in the processor core 120 in place of the transposition unit 18 depicted in FIG. 5.

The transposition unit 18C includes two transposition buffers 42a and 42b that retain data of 2048 bits read out from the memory 210 (FIG. 5) through the memory bus MB in order to transpose the data. Further, the transposition unit 18C includes two transposition buffers 50a and 50b that retain data of 2048 bits read out from the register files RF0 to RF7 in order to transpose the data.

The transposition unit 18C includes data shift controllers 32D and 32E, memory input selector units 40Ca and 40Cb, register output selector units 44Ca and 44Cb, a crossbar switch 46, register input selector units 48Ca and 48Cb and memory output selector units 52Ca and 52Cb. The data shift controller 32D includes a buffer input controller 34D and a buffer output controller 36D including a counter 38D. The data shift controller 32E includes a buffer input controller 34E including a counter 38E, and a buffer output controller 36E.

The buffer input controller 34D has functions similar to those of the buffer input controller 34A depicted in FIG. 6 except that it outputs one of the enable signals EN (ENa0 to ENa7 and ENb0 to ENb7). Further, the buffer input controller 34D outputs a transfer start signal TS1a after seven cycles after outputting of the enable signal ENa0 and outputs a transfer start signal TS1b after seven cycles after outputting of the enable signal ENb0.

The buffer output controller 36D has functions similar to those of the buffer output controller 36A depicted in FIG. 6 except that it outputs selection signals SELda and SELdb in place of the selection signals SEL0 to SEL7. The buffer output controller 36D controls the counter 38D to generate lower 3 bits of the selection signal SELda of 4 bits in response to reception of the transfer start signal TS1a. Further, the buffer output controller 36D controls the counter 38D to generate lower 3 bits of the selection signal SELdb of 4 bits in response to reception of the transfer start signal TS1b. In the selection signals SELda and SELdb, when the most significant one bit is valid, the lower 3 bits are valid.

Figure 26:
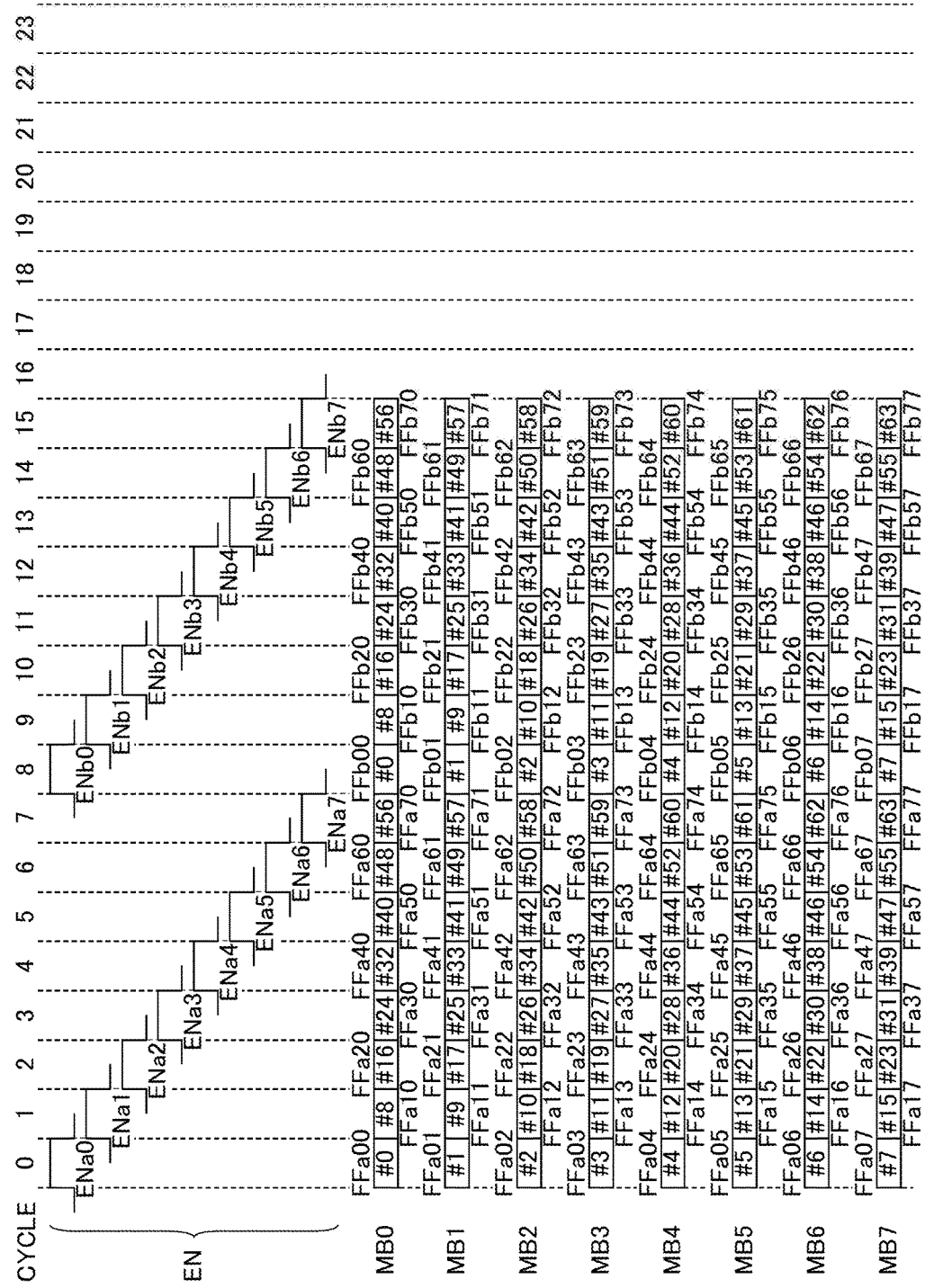
FIG. 26 depicts an example of operation of a memory input selector unit depicted in FIG. 22.

The memory input selector units 40Ca and 40Cb each include a configuration same as that of the memory input selector unit 40 depicted in FIG. 7. The memory input selector unit 40Ca outputs data of 256 bits received through the memory bus MB to one of eight data lines (256 bits) in response to the enable signals ENa0 to ENa7. The memory input selector unit 40Cb outputs data of 256 bits received through the memory bus MB to one of the eight data lines (256 bits) in response to the enable signals ENb0 to ENb7. The enable signals ENa0 to ENa7 are used to output data to the transposition buffer 42a, and the enable signals ENb0 to ENb7 are used to output data to the transposition buffer 42b. An example of operation of the memory input selector units 40Ca and 40Cb is depicted in FIG. 26.

Each of the transposition buffers 42a and 42b includes a configuration same as that of the transposition buffer 42 depicted in FIG. 7. For example, the transposition buffer 42a includes 64 retention circuits FFa (FFa00 to FFa07, FFa10 to FFa17, FFa20 to FFa27, . . . , and FFa70 to FFa77) similarly to the transposition buffer 42 depicted in FIG. 7. The transposition buffer 42b includes 64 retention circuits FFb (FFb00 to FFb07, FFb10 to FFb17, FFb20 to FFb27, . . . , and FFb70 to FFb77) similarly to the transposition buffer 42 depicted in FIG. 7.

The transposition buffer 42a outputs data of 2048 bits retained therein to data lines DLa (DLa00 to DLa77), and the transposition buffer 42b outputs data of 2048 bits retained therein to the data lines DLb (DLb00 to DLb77). The data lines DLa00 to DLa77 correspond to DL0° to DL77 depicted in FIG. 7, respectively, and the data lines DLb00 to DLb77 correspond to the data lines DL00 to DL77 depicted in FIG. 7, respectively. The data lines DLa00 to DLa77 and the data lines DLb00 to DLb77 are each a 32-bit line and, for example, the data lines DLa00 to DLa07 transmit 256 bits. For example, the data lines DLa00 to DLa07 are coupled to the column unit CUL0 of the transposition buffer 42a, and the DLb70 to DLb77 are coupled to the column unit CUL7 of the transposition buffer 42b.

Figure 23:
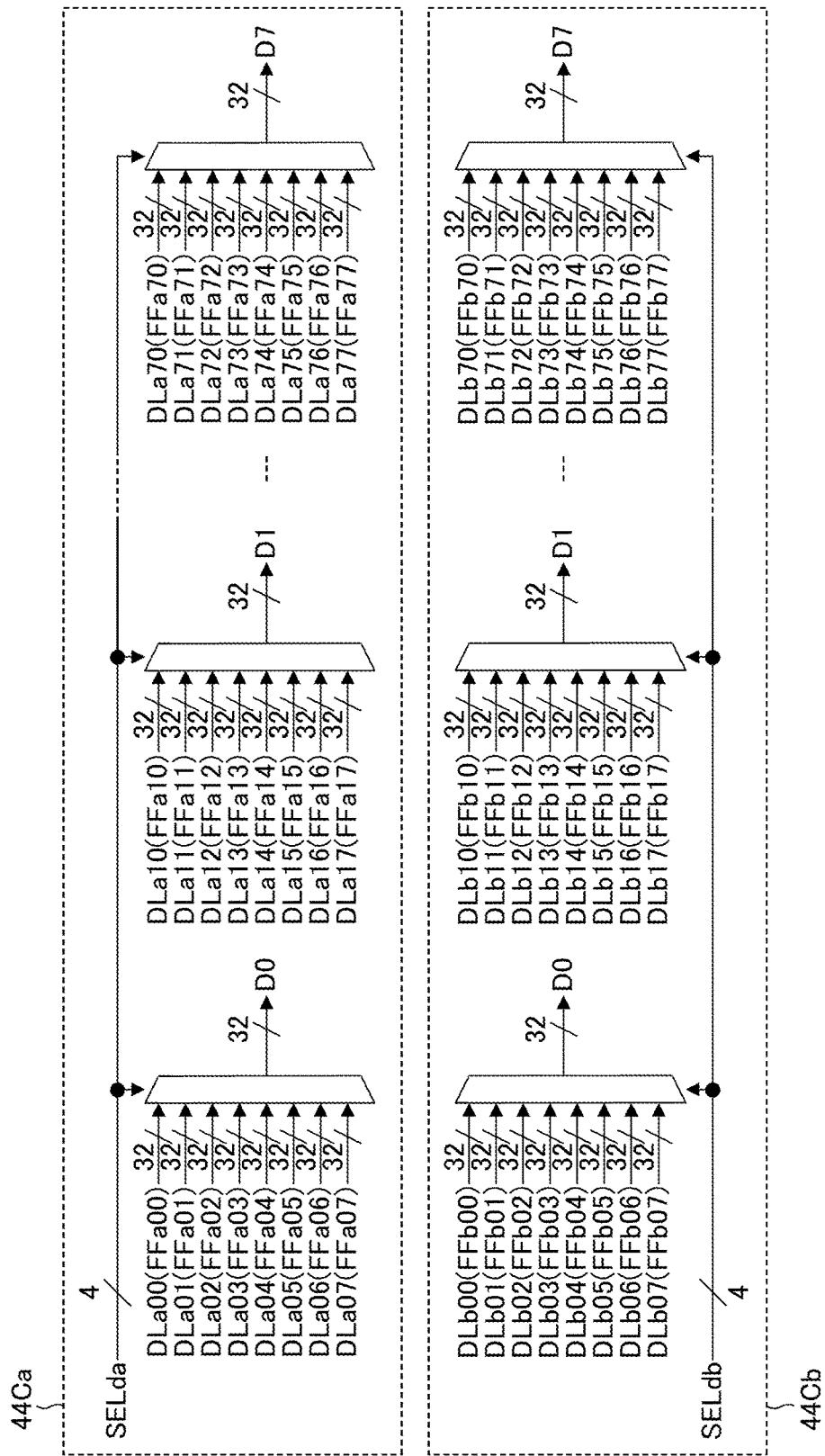
FIG. 23 depicts an example of a register output selector unit depicted in FIG. 22.

The register output selector unit 44Ca outputs data received through the data lines DLa (DLa00 to DLa77) to the data lines D0 to D7 in response to the selection signal SELda. The register output selector unit 44Cb outputs data received through the data lines DLb (DLb00 to DLb77) to the data lines D0 to D7 in response to the selection signal SELdb. An example of the register output selector units 44Ca and 44Cb is depicted in FIG. 23.

The buffer input controller 34E has functions similar to those of the buffer input controller 34B depicted in FIG. 6 except that it outputs enable signals ENa00 to ENa77 and ENb00 to ENb77 in place of the enable signals EN00 to EN77. The buffer input controller 34E controls the counter 38E to operate every time it receives a valid signal SVALID outputted from the load/store engine 16 depicted in FIG. 5. The buffer input controller 34E outputs enable signals ENa00 to ENa77 and ENb00 to ENb77 in response to a counter value counted by the counter 38E.

Figure 28:
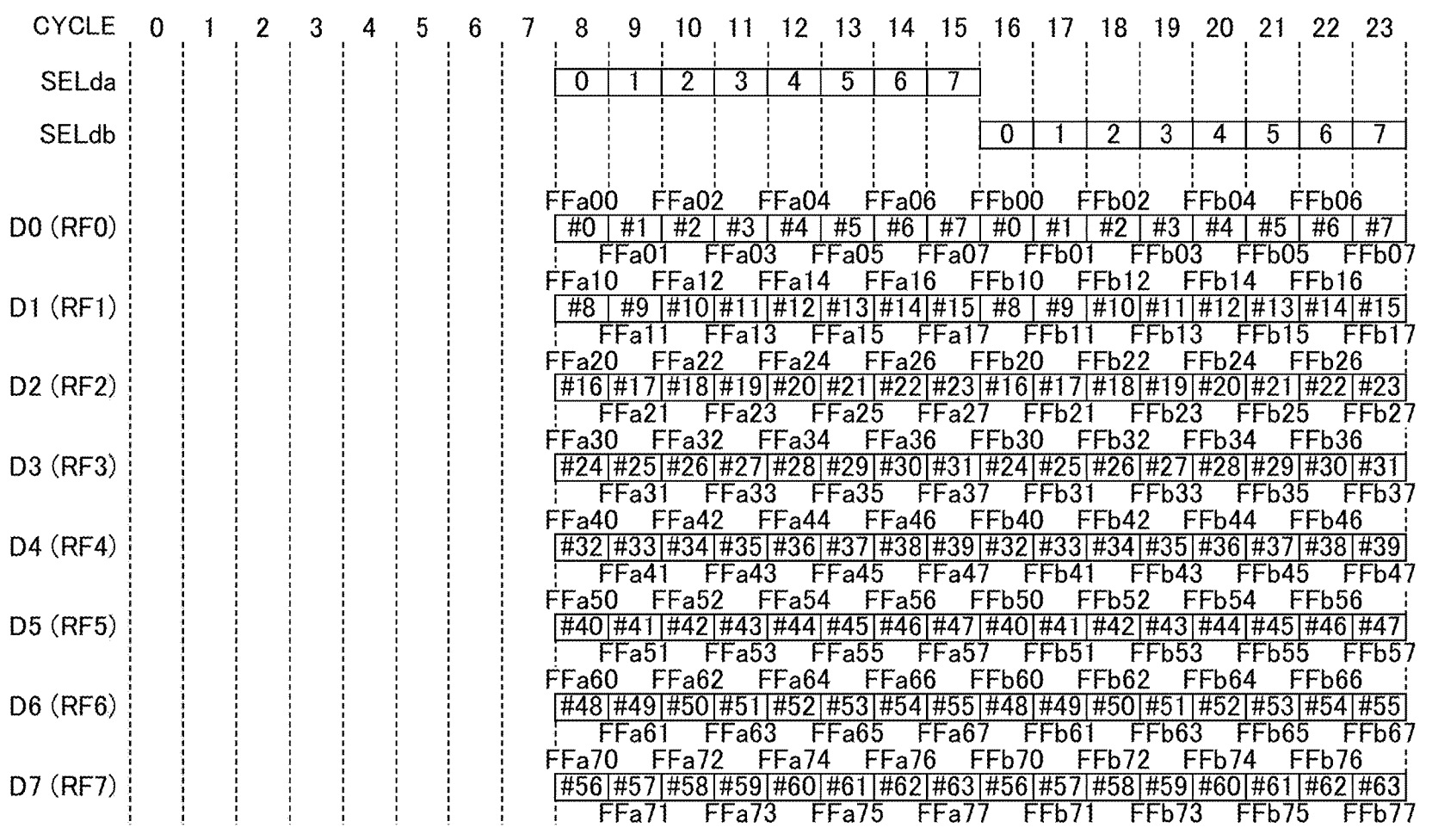

Further, the buffer input controller 34E includes a counter 38E. The buffer input controller 34E controls the counter 38E to start counting in accordance with a timing at which data are outputted to the data lines D from each of the register files RF0 to RF7. The buffer input controller 34E controls the counter 38E to generate enable signals ENa00 to ENa77 or enable signals ENb00 to ENb77. An example of the enable signals ENa00 to ENa77 and ENb00 to ENb77 generated by the counter 38E is depicted in FIG. 28.

Figure 24:
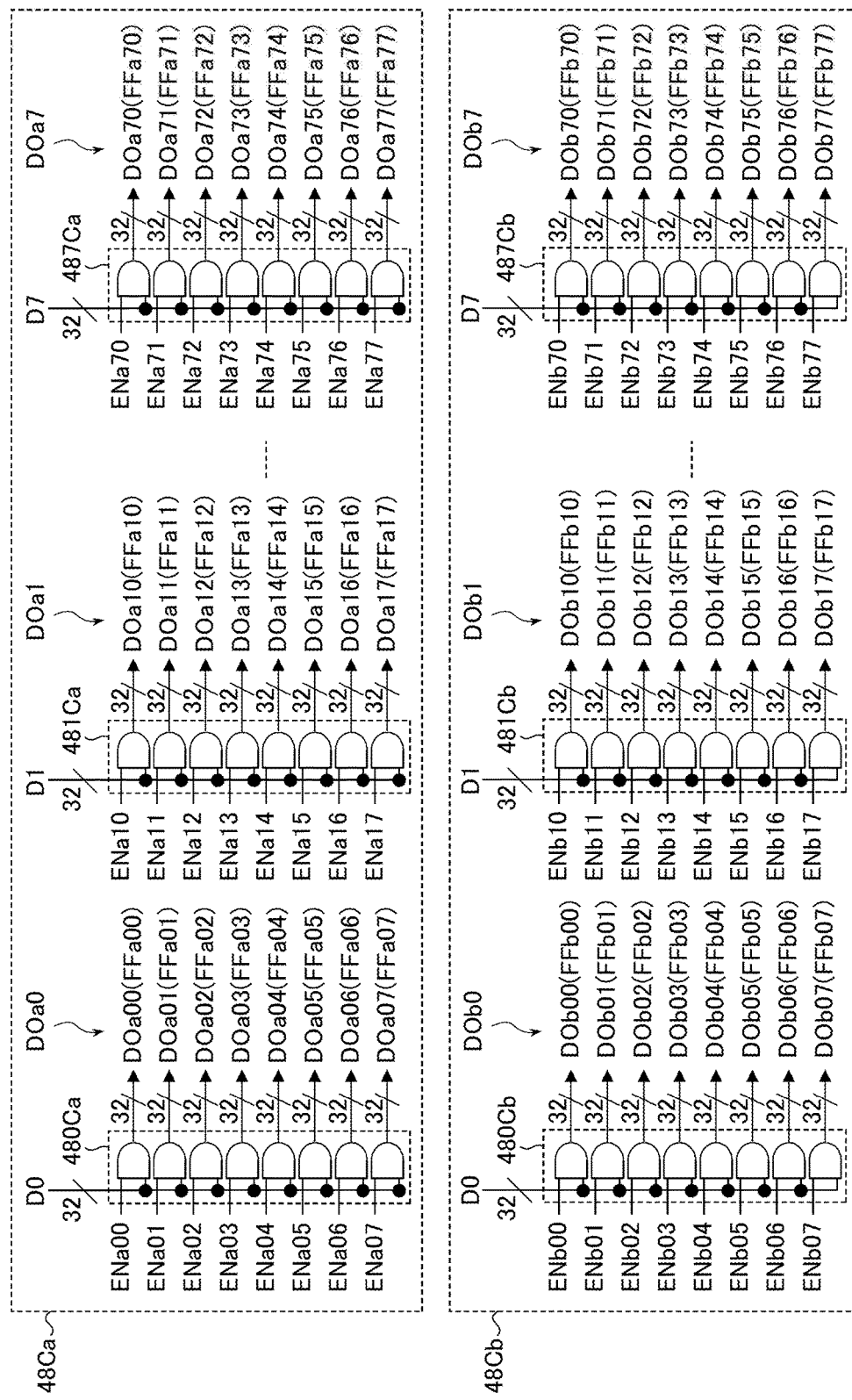
FIG. 24 depicts an example of a register input selector unit depicted in FIG. 22.

The register input selector unit 48Ca outputs data supplied to the data lines D0 to D7 through the crossbar switch 46 to the transposition buffer 50a through the data lines DOa0 to DOa7 in response to the enable signals ENa00 to ENa77. The register input selector unit 48Cb outputs data supplied to the data lines D0 to D7 through the crossbar switch 46 to the transposition buffer 50b through the data lines DOb0 to DOb7 in response to the enable signals ENb00 to ENb77. An example of the register input selector units 48Ca and 48Cb is depicted in FIG. 24.

Each of the transposition buffers 50a and 50b includes a configuration same as that of the transposition buffer 50 depicted in FIG. 10. The transposition buffer 50a retains data of 2048 bits supplied to the data lines DOa0 to DOa7 and outputs the retained data to the data lines DSa (DSa00 to DSa77). The transposition buffer 50b retains data of 2048 bits supplied to the data lines DOb0 to DOb7 and outputs the retained data to the data lines DSb (DSb00 to DSb77).

The memory output selector unit 52Ca selects data received through the data lines DSa in response to the selection signal SELea and outputs the selected data to the memory bus MB. The memory output selector unit 52Cb selects data received through the data lines DSb in response to the selection signal SELeb and outputs the selected data to the memory bus MB. An example of the memory output selector units 52Ca and 52Cb is depicted in FIG. 25.

FIG. 23 depicts an example of the register output selector unit depicted in FIG. 22. Each of the register output selector units 44Ca and 44Cb includes a configuration same as that of the register output selector unit 44 depicted in FIG. 8 except that it receives a common selection signal SELda or a common selection signal SELdb in place of the selection signals SEL0 to SEL7. The register output selector unit 44Ca includes eight selectors that output data individually to the data lines D0 to D7. When the value of the lower 3 bits of the selection signal SELda is one of "0" to "7," the eight selectors select 32 bits from data of 256 bits retained by each of the column units CUL0 to CUL7 of the transposition buffer 50a in response to the value of the selection signal SELda and outputs the 32 bits to one of the data lines D0 to D7. The register output selector unit 44Cb includes eight selectors that output data individually to the data lines D0 to D7. When the value of the lower 3 bits of the selection signal SELdb is one of "0" to "7," the eight selectors select 32 bits from data of 256 bits retained by each of the column units CUL0 to CUL7 of the transposition buffer 50b in response to the value of the selection signal SELdb and outputs the 32 bits to one of the data lines D0 to D7.

FIG. 24 depicts an example of the register input selector unit depicted in FIG. 22. Each of the register input selector units 48Ca and 48Cb includes a configuration same as that of the register input selector unit 48 depicted in FIG. 9 except that it receives an enable signal ENa or an enable signal ENb in place of the enable signal EN. The register input selector unit 48Ca includes eight selectors 480Ca, 481Ca, ..., and 487Ca that couple the data lines D (D0 to D7) to the data lines DOa (DOa0 to DOa7). Each of the selectors 480Ca, 481Ca, ..., and 487Ca couples a data line to a data line DOa in response to the enable signal ENa. The register input selector unit 48Cb includes eight selectors 480Cb, 481Cb, ..., and 487Cb that couple the data lines D (D0 to D7) to the data lines DOb (DOb0 to DOb7). Each of the selectors 480Cb, 481Cb, ..., and 487Cb couples a data line to a data line DOb in response to the enable signal ENb.

Figure 25:
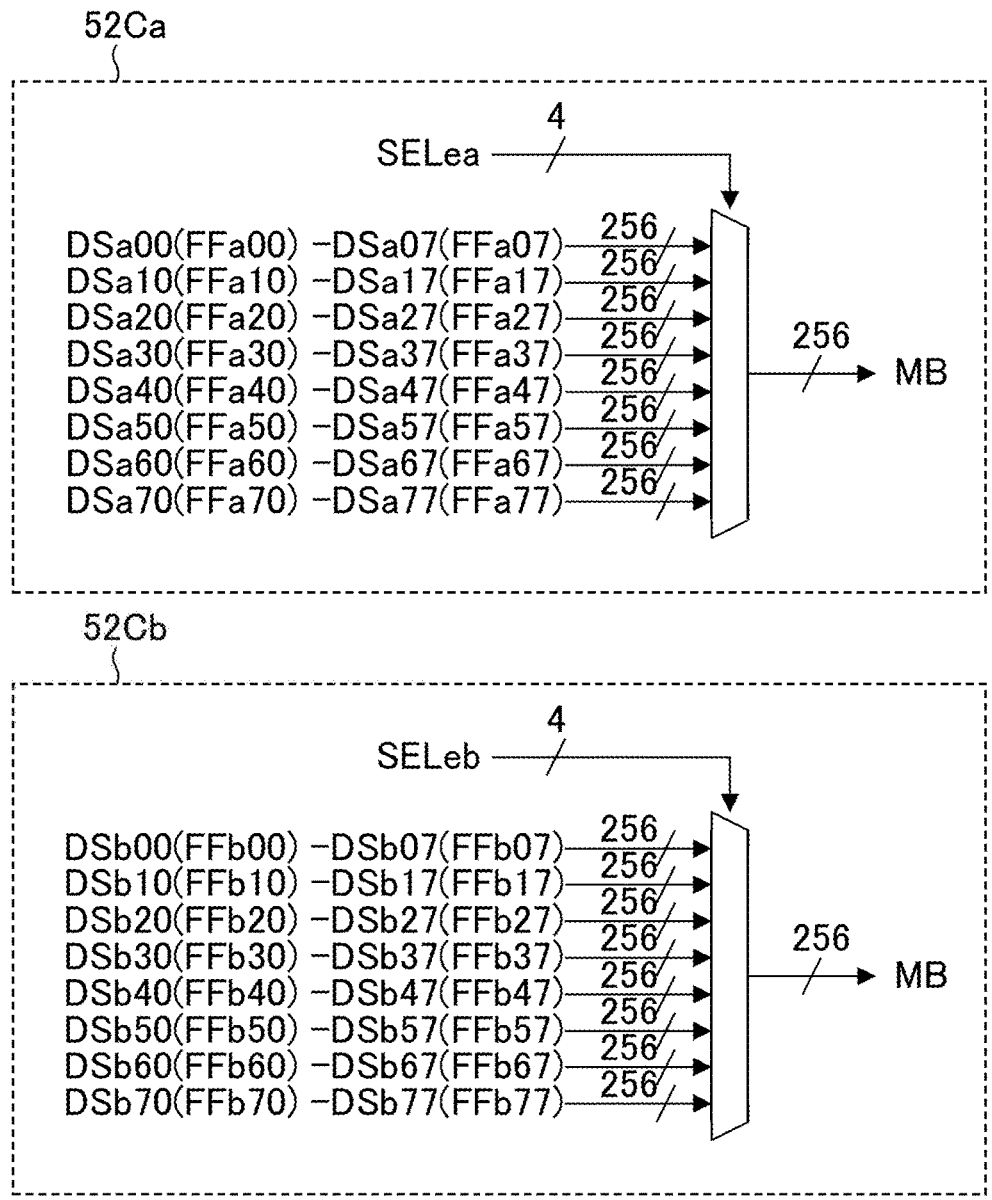
FIG. 25 depicts an example of a memory output selector unit depicted in FIG. 22.

FIG. 25 depicts an example of the memory output selector unit depicted in FIG. 22. Each of the memory output selector units 52Ca and 52Cb includes a configuration same as that of the memory output selector unit 52C depicted in FIG. 11 except that it receives selection signals SELea and SELeb in place of the selection signal SEL. When the lower 3 bits of the selection signal SELea indicate "2," the memory output selector unit 52Ca outputs data of 256 bits supplied to the data lines DSa20 to DSa27 to the memory buses MB. If the lower 3 bits of the selection signal SELeb indicates "6," the memory output selector unit 52Cb outputs data of 256 bits supplied to the data lines DSb60 to DSb67 to the memory buses MB. If the logic of the most significant bit of the selection signals SELea and SELeb indicates an invalid state, the memory output selector units 52Ca and 52Cb stop outputting of data to the memory buses MB.

FIG. 26 depicts an example of operation of the memory input selector unit depicted in FIG. 22. In the example depicted in FIG. 26, data #0 to #63 of 2048 bits are read out successively twice from the memory 210 in accordance with two load instructions ld. The data of 2048 bits read out first are stored into the retention circuit FFa of the transposition buffer 42a, and the data of 2048 bits read out for the second time are stored into the retention circuit FFb of the transposition buffer 42b. The retention circuits FFa and FFb (for example, column units CUL0 to CUL7) that retain data are selected in response to the enable signals ENa0 to ENa7 and ENb0 to ENb7.

Figure 27:
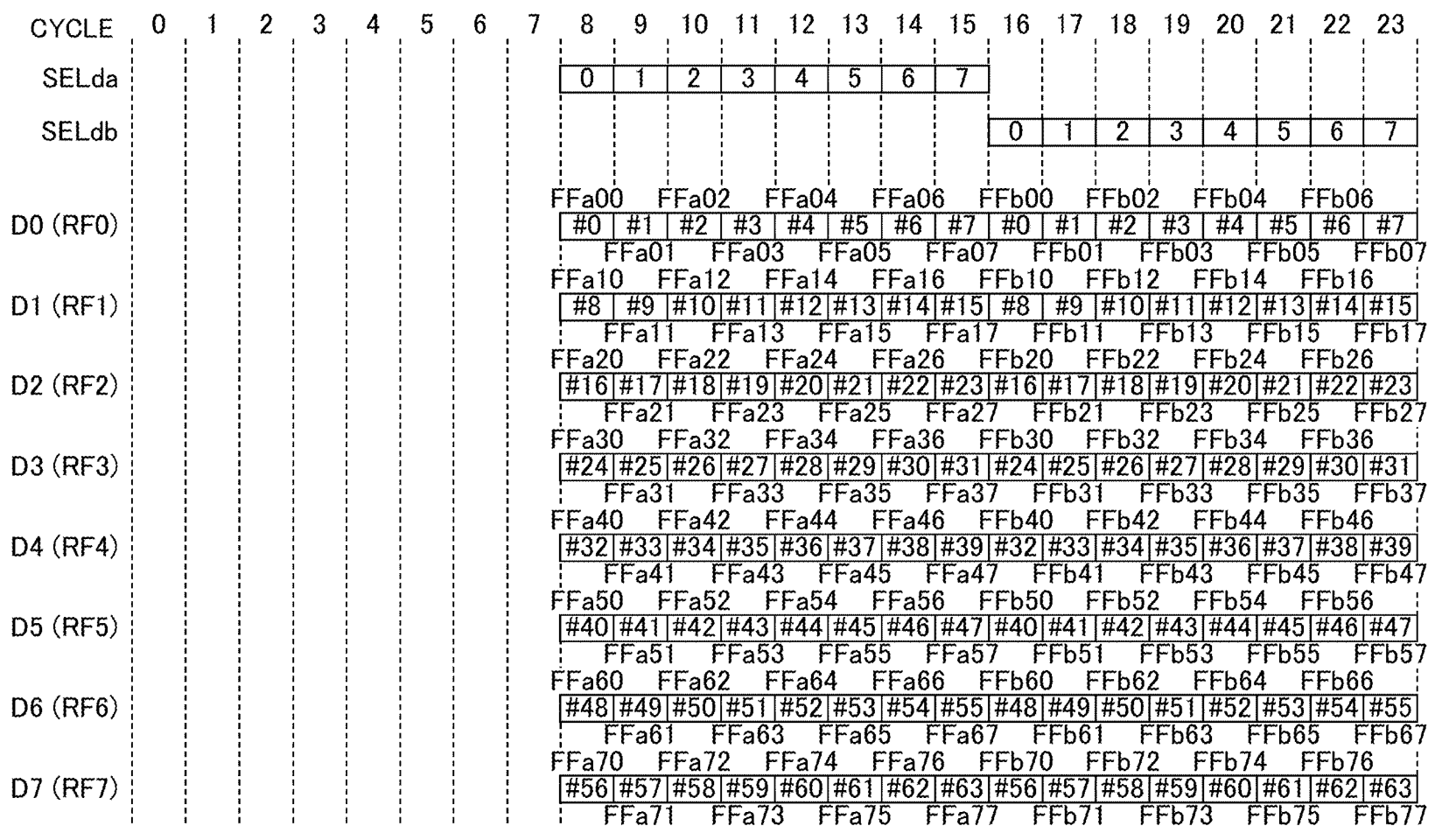

FIG. 27 depicts an example of operation of the register output selector unit depicted in FIG. 22. The operation depicted in FIG. 27 is executed in parallel to the operation depicted in FIG. 26. The register output selector unit 44Ca selects 32 bits from each of the column units CUL0 to CUL7 of the transposition buffer 42a in response to the value of the selection signal SELda and outputs the selected data to the data lines D0 to D7. Meanwhile, the register output selector unit 44Cb selects 32 bits from each of the column units CUL0 to CUL7 of the transposition buffer 42b in response to the value of the selection signal SELdb and outputs the selected data to the data lines D0 to D7. Consequently, data retained in the transposition buffers 42a and 42b are transposed and stored into the register files RF0 to RF7. It is to be noted that the data retained in the transposition buffer 42a and the data retained in the transposition buffer 42b are stored into words WL different from each other in the register files RF0 to RF7 without overlapping with each other.

As depicted in FIGS. 26 and 27, since data of 2048 bits are retained alternately into the two transposition buffers 42a and 42b, it is possible to successively generate transposition data without losing any data and store the generated transposition data into the register files RF0 to RF7. For example, the transposition unit 18C depicted in FIG. 22 may execute a transposition operation similar to that of FIGS. 14 and 15. However, in this case, the number (128) of retention circuits FF incorporated in the transposition buffers 42a and 42b is twice the number (64) of retention circuits FF incorporated in the transposition buffer 42 depicted in FIG. 6. For example, the number (4096) of flip-flops incorporated in the transposition buffers 42a and 42b is twice the number (2048) of flip-flops incorporated in the transposition buffer 42.

FIG. 28 depicts an example of operation of the register input selector unit depicted in FIG. 22. The register input selector unit 48Ca outputs data successively supplied to the data lines D0 to D7 to the data lines D0a0 to D0a7 in response to the enable signals ENa00 to ENa77. Consequently, the data supplied to the data lines D0 to D7 are stored into the transposition buffer 50a. The register input selector unit 48Cb outputs data successively supplied to the data lines D0 to D7 to the data lines D0b0 to D0b7 in response to the enable signals ENb00 to ENb77. Consequently, the data supplied to the data lines D0 to D7 are stored into the transposition buffer 50b.

Figure 29:
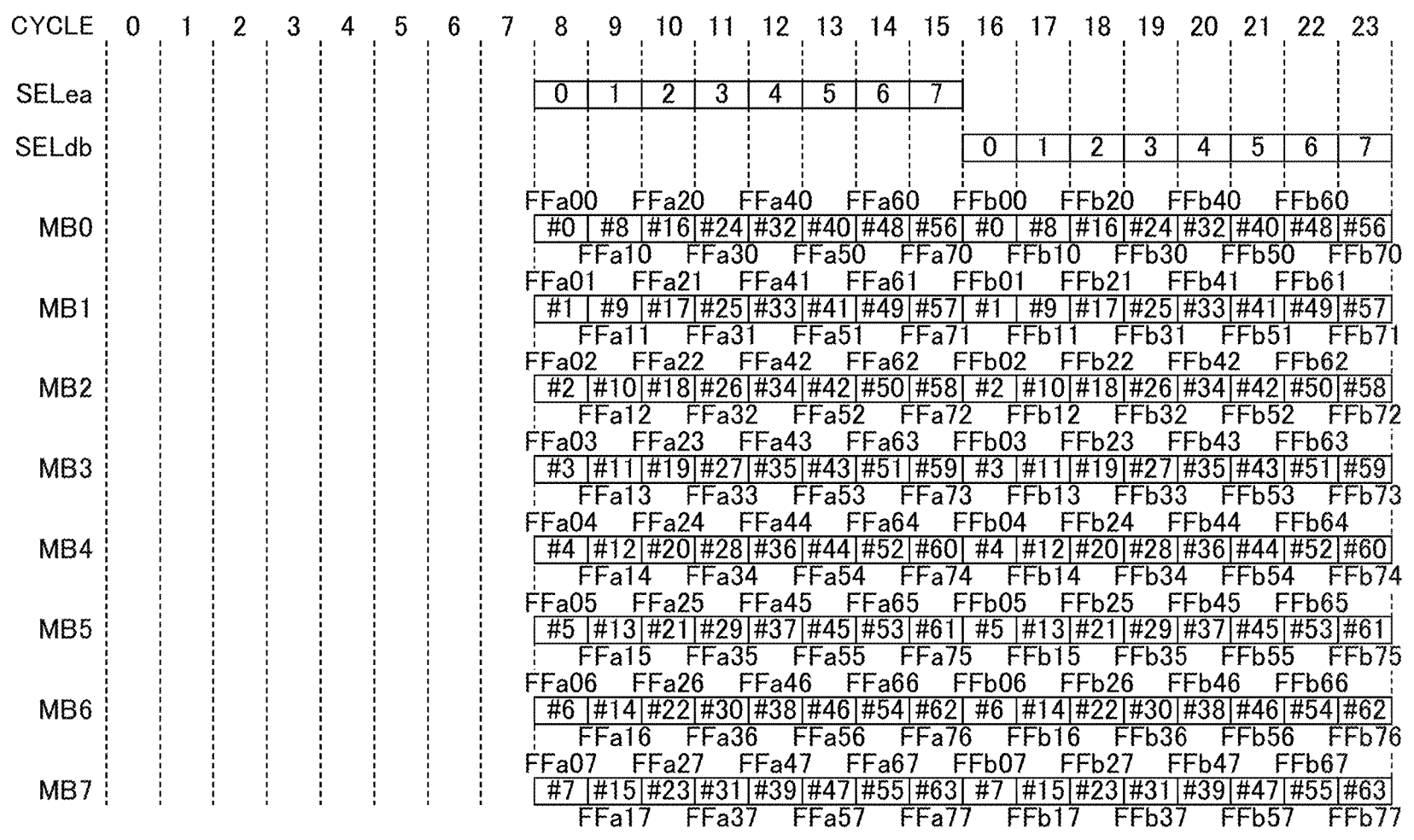

FIG. 29 depicts an example of operation of the memory output selector unit depicted in FIG. 22. The operation depicted in FIG. 29 is executed in parallel to the operation depicted in FIG. 28. The memory output selector unit 52Ca selects one of data of 256 bits retained by the column units CUL0 to CUL7 of the transposition buffer 50a in response to the value of the selection signal SELea and outputs the selected data to the memory buses MB (MB0 to MB7). The memory output selector unit 52Cb selects one of data of 256 bits retained by the column units CUL0 to CUL7 of the transposition buffer 50b in response to the value of the selection signal SELeb and outputs the selected data to the memory buses MB (MB0 to MB7). Then, the data read out from the register files RF0 to RF7 are transposed and written into the memory 210.

By retaining data of 2048 bits alternately into the two transposition buffers 50a and 50b as depicted in FIGS. 28 and 29, the array of data read out successively from the register files RF0 to RF7 may be transposed without losing any data. For example, the transposition unit 18C depicted in FIG. 22 may execute a transposition operation similar to that of FIGS. 17 and 18. However, in this case, the number (128) of retention circuits FF incorporated in the transposition buffers 50a and 50b is twice the number (64) of retention circuits FF incorporated in the transposition buffer 50 depicted in FIG. 6. For example, the number (4096) of flip-flops incorporated in the transposition buffers 50a and 50b is twice the number (2048) of flip-flops incorporated in the transposition buffer 50b.

For example, in the transposition unit 18 depicted in FIG. 6, the number of retention circuits FF that operate in synchronism with a clock signal may be reduced to one half in comparison with the transposition unit 18C depicted in FIG. 22. Accordingly, the circuit size of the transposition buffers 42 and 50 may be reduced to approximately one half the circuit size of the transposition buffers 42a, 42b, 50a and 50b. Further, the power consumption of the transposition buffers 42 and 50 may be reduced to approximately one half the power consumption of the transposition buffers 42a, 42b, 50a and 50b. As a result, the chip size of the arithmetic processing apparatus 110 depicted in FIG. 5 may be reduced in comparison with the chip size of the arithmetic processing apparatus in which the transposition unit 18C is incorporated. The power consumption of the arithmetic processing apparatus 110 depicted in FIG. 5 may be reduced in comparison with power consumption of the arithmetic processing apparatus in which the transposition unit 18C is incorporated.

As described above, in FIGS. 5 to 21, advantageous effects similar to those of the embodiment depicted in FIGS. 1 to 4 may be achieved. For example, also where data to be transposed are successively supplied to the transposition buffer 42, it is possible to transpose the data without losing any data and store the transposed data into the register unit 22. Accordingly, the arithmetic operation execution unit 20 may execute a plurality of arithmetic operations successively using data read out successively from the memory 210 in response to a plurality of load instructions Id and transposed using the transposition buffer 42.

Since data successively supplied may be transposed using the single transposition buffer 42, the circuit scale may be reduced in comparison with that in an alternative case in which data are transposed using the two transposition buffers 42a and 42b (FIG. 22). Further, since data read out from the memory 210 and supplied through the bypass route BYPS are transferred to the register unit 22 through the crossbar switch 46, the data may be stored into the register files RF0 to RF7 without being transposed.

In the embodiment depicted in FIGS. 5 to 21, for example, the following effects may be anticipated. Also when data are transferred from the register unit 22 to the transposition buffer 50 without a break in response to a plurality of store instructions st, it is possible to transpose data stored in the transposition buffer 50 by reading out the data without losing any data and write the transposed data into the memory 210. Since data successively read out from the register unit 22 may be transposed using the single transposition buffer 50, the circuit scale may be reduced in comparison with an alternative case in which data are transposed using the two transposition buffers 50a and 50b (FIG. 22). By transferring data read out from the register unit 22 to the bypass route BYPS through the crossbar switch 46, the data may be written into the memory 210 without being transposed.

By selecting data retained in the column units CUL0 to CUL7 of the transposition buffer 42 using the selection signals SEL0 to SEL7, the outputting timings of data to the data lines D0 to D7 may be controlled independently of each other. Consequently, even when data are successively supplied to the transposition buffer 42, data retained in the column units CUL0 to CUL7 may be read out without being lost. Further, by supplying the selection signals SEL0 to SEL7 for controlling the register output selector unit 44 to the register files RF0 to RF7, the timings at which transposed data are written into the words WL of the register files RF0 to RF7 may be controlled independently of each other.

By causing the selectors 480 to 487 of the register input selector unit 48 to select data to be successively read out from the register unit 22 to the data lines D0 to D7 using the enable signals EN00 to EN77, the operation depicted in FIG. 17 may be implemented. Further, by supplying the enable signals EN00 to EN77 for controlling the register input selector unit 48 to the register files RF0 to RF7, data may be read out from the register unit 22 in accordance with operation timings of the register input selector unit 48.

The number of retention circuits FF incorporated into the transposition buffers 42 and 50 may be reduced to one half the number of retention circuits FF incorporated in the transposition buffers 42a, 42b, 50a and 50b depicted in FIG. 22. Therefore, the chip size of the arithmetic processing apparatus 110 depicted in FIG. 5 may be reduced in comparison with the chip size of the arithmetic processing apparatus in which the transposition unit 18C depicted in FIG. 22 is incorporated. By reduction of the number of retention circuits FF, the power consumption of the transposition buffers 42 and 50 may be reduced to approximately one half the power consumption of the transposition buffers 42a, 42b, 50a and 50b. As a result, the power consumption of the transposition unit 18 of the arithmetic processing apparatus 110 depicted in FIG. 5 may be reduced in comparison with the power consumption of the transposition unit 18C depicted in FIG. 22.

Further, where the arithmetic processing apparatus 18 executes a plurality of load instructions Id successively, the transfer rate of data to be transferred from the memory 210 to the register unit 22 may be made equal to the transfer rate of data by the arithmetic processing apparatus 18C. Further, where the arithmetic processing apparatus 18 executes a plurality of store instructions st successively, the transfer rate of data transferred from the register unit 22 to the memory 210 may be made equal to the transfer rate of data by the arithmetic processing apparatus 18C. Accordingly, while the arithmetic processing apparatus 18 does not degrade the transfer efficiency of data, the chip size may be reduced and the power consumption may be reduced in comparison with the arithmetic processing apparatus 18C.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing apparatus, comprising:
   an arithmetic operation execution circuit configured to execute an arithmetic operation;
   a first register configured to store data to be used for an arithmetic operation by the arithmetic operation execution circuit;
   a first buffer configured to store data;
   a first controller configured to store each of a plurality of data groups each corresponding to a plurality of data bits at once into the first buffer when the arithmetic processing apparatus determines that an array of data is to be changed and the changed data is stored into the first register as the data to be used for the arithmetic operation, the plurality of data groups being received successively;
   a second controller configured to successively output, every time each of the plurality of data groups is stored into the first buffer, data included in the plurality of data groups stored in the first buffer to the first register;
   a plurality of first register files provided in the first register and configured to individually store a plurality of data as the data to be used for the arithmetic operation;
   a plurality of first memory areas provided in the first buffer and configured to retain the plurality of data groups;
   a first selector configured to be controlled by the first controller and output each of the plurality of data groups to one of the plurality of first memory areas successively;
   a plurality of second selectors configured to be controlled by the second controller; and
   a plurality of first data lines configured to couple the plurality of second selectors to the plurality of first register files, respectively,
   each of the plurality of second selectors successively selects, in response to that a data group is retained into a corresponding one of the plurality of first memory areas, data included in the retained data group and outputs the data which are selected to corresponding one of the plurality of first data lines; and
   the arithmetic operation execution circuit executes the arithmetic operation using the plurality of data retained in the plurality of first register files.

2. The arithmetic processing apparatus according to claim 1,
   wherein it is determined, based on a value of a transposition flag included in an operand of a load instruction, that the array of data is to be changed and the changed data is stored into the first register as the data to be used for the arithmetic operation.

3. The arithmetic processing apparatus according to claim 1, wherein each of the plurality of second selectors successively selects, in cycles beginning with a cycle next to a cycle in which the data group is retained into the corresponding first memory area, the plurality of data included in the data group retained in the corresponding first memory area.

4. The arithmetic processing apparatus according to claim 1, wherein the second controller includes a first signal generator configured to successively generate, every time a data group is retained into one of the plurality of first memory areas, a first selection signal to be outputted to the second selector corresponding to the first memory area in which the data group is retained; and each of the plurality of second selectors selects one of the plurality of data included in the data group retained by the corresponding first memory area in response to the first selection signal.

5. The arithmetic processing apparatus according to claim 4, wherein the first selection signal is used for control to write data into each of the plurality of first register files.

6. The arithmetic processing apparatus according to claim 1, further comprising:
   a second register including a plurality of second register files configured to individually store a plurality of data each indicative of a result of execution of an arithmetic operation executed by the arithmetic operation execution circuit;
   a second buffer including a plurality of second memory areas individually corresponding to the plurality of second register files;
   a third controller configured to store the plurality of data successively read out from the plurality of second register files in cycles displaced from each other into corresponding ones of the plurality of second memory areas; and a fourth controller configured to output the plurality of data stored in the plurality of second memory areas in order beginning with the second memory area into which storage of a plurality of data is completed.

7. The arithmetic processing apparatus according to claim 6, wherein the third controller includes:
a plurality of third selectors individually provided correspondingly to the plurality of second register files and the plurality of second memory areas; and
a second signal generator configured to generate a plurality of second selection signals to be individually outputted in cycles different from each other to the plurality of third selectors, and each of the plurality of third selectors selects one of the plurality of data read out from the corresponding second register file in response to each of the plurality of second selection signals and outputs the selected data to the corresponding second memory area.

8. The arithmetic processing apparatus according to claim 7, wherein the plurality of second selection signals are used for control to read out data from each of the plurality of second register files.

9. The arithmetic processing apparatus according to claim 6, wherein the fourth controller includes:
a third signal generator configured to generate, every time storage of the plurality of data from one of the plurality of second register files into one of the plurality of second memory areas is completed, a third selection signal corresponding to the second memory area into which the storage of the plurality of data is completed; and
a fourth selector configured to select the plurality of data retained in one of the plurality of second memory areas in response to the third selection signal and output the selected plurality of data.

10. The arithmetic processing apparatus according to claim 1, further comprising:
a decoder configured to decode an instruction;
wherein the first controller and the second controller operate in response to decoding of a load instruction including a transposition process of data by the decoder.

11. The arithmetic processing apparatus according to claim 1, further comprising:
a bypass route configured to transfer the plurality of data groups received successively to the first register without intervention of the first buffer; and
a switch configured to couple one of an output of the first buffer and the bypass route to the first register.

12. The arithmetic processing apparatus according to claim 6, further comprising:
a decoder configured to decode an instruction;
wherein the third controller and the fourth controller operate in response to decoding of a store instruction including a transposition process of data by the decoder.

13. The arithmetic processing apparatus according to claim 6, further comprising:
a bypass route configured to transfer the plurality of data retained in the second register to a data line, which transmits the plurality of data outputted from the second buffer, without intervention of the second buffer; and
a switch configured to couple the second register to one of an input of the second buffer and the bypass route.

14. A control method for an arithmetic processing apparatus, comprising:
storing, by a first controller, each of a plurality of data groups each corresponding to a plurality of data bits at once into a first buffer as the data to be used for the arithmetic operation by an arithmetic operation execution circuit; and
outputting, by a second controller, successively, every time each of the plurality of data groups is stored into the first buffer, data included in the plurality of data groups stored in the first buffer to a first register,
a plurality of first register files are provided in the first register and individually store a plurality of data as the data to be used for the arithmetic operation;
a plurality of first memory areas are provided in the first buffer and retain the plurality of data groups;
a first selector is controlled by the first controller and outputs each of the plurality of data groups to one of the plurality of first memory areas successively;
a plurality of second selectors are controlled by the second controller;
a plurality of first data lines couple the plurality of second selectors to the plurality of first register files, respectively;
each of the plurality of second selectors successively selects, in response to that a data group is retained into a corresponding one of the plurality of first memory areas, data included in the retained data group and outputs the data which are selected to corresponding one of the plurality of first data lines; and
the arithmetic operation execution circuit executes the arithmetic operation using the plurality of data retained in the plurality of first register files.

15. The control method according to claim 14, further comprising:
decoding, by a decoder, an instruction; and
performing the storing and the outputting in response to decoding of a load instruction including a transposition process of data by the decoder.

16. The control method according to claim 14, further comprising:
transferring, a bypass route, the plurality of data groups received successively to the first register without intervention of the first buffer; and
coupling one of an output of the first buffer and the bypass route to the first register.

* * * * *